(12) United States Patent
Bradford et al.

(10) Patent No.: US 9,539,526 B2
(45) Date of Patent: Jan. 10, 2017

(54) FILTER ASSEMBLY AND SYSTEMS/METHODS OF DISPENSING FROM AND STORING THE FILTER ASSEMBLY

(71) Applicant: Whirlpool Corporation, Benton Harbor, MI (US)

(72) Inventors: Scott Hugh Bradford, Gavirate (IT); Marco Casucci, Varese (IT); David P. Cooper, Kalamazoo, MI (US); Beth M. Jackson, St. Joseph, MI (US); James W. Kendall, Mt. Prospect, IL (US); Italo Renzo Menegon, Brenta (IT); Ginger Elayne Patera, St. Joseph, MI (US); Sara Manfredini-Taube, Varese (IT); Torsten Rickard Mathias-Tingstrom, Ispra (IT); Joel Graham Vanfaasen, Holland, MI (US)

(73) Assignee: Whirlpool Corporation, Benton Harbor, MI (US)

(*) Notice: Subject to any disclaimer, the term of this patent is extended or adjusted under 35 U.S.C. 154(b) by 444 days.

(21) Appl. No.: 14/095,110

(22) Filed: Dec. 3, 2013

(65) Prior Publication Data

US 2014/0175005 A1 Jun. 26, 2014

Related U.S. Application Data

(60) Provisional application No. 61/733,020, filed on Dec. 4, 2012.

(51) Int. Cl.
*B01D 29/00* (2006.01)
*C02F 1/00* (2006.01)
(Continued)

(52) U.S. Cl.
CPC ............... *B01D 23/02* (2013.01); *B01D 23/06* (2013.01); *B01D 23/28* (2013.01); *C02F 1/003* (2013.01);
(Continued)

(58) Field of Classification Search
CPC ......... B01D 23/02; B01D 23/06; B01D 23/08; B01D 23/20; B01D 23/28; C02F 1/002; C02F 1/003
See application file for complete search history.

(56) References Cited

U.S. PATENT DOCUMENTS

| 651,948 A | 6/1900 | Lawson |
| 1,536,890 A | 5/1925 | Lagemann |

(Continued)

FOREIGN PATENT DOCUMENTS

| EP | 1354857 A1 | 10/2003 |
| FR | 2884829 A1 | 10/2003 |

(Continued)

OTHER PUBLICATIONS

Drop Speaker, Zumreed, "Music with Style", Copyright 2010 Dreams, Inc.

(Continued)

*Primary Examiner* — Robert Clemente

(57) ABSTRACT

A gravity-driven water filtering system comprising: a gravity-driven water filter configured to engage and deliver treated water through apertures of various sizes and a filter receiving device. The gravity-driven water filter includes: a bottom portion; a water filter; and a top portion. The water filter is configured to be removably engaged by hand without the use of tools from the bottom portion and the water filter, the bottom portion and the top portion are each configured to be removably engaged and disengaged to allow for replacement of the filter and reassembly of the overall (Continued)

gravity filter assembly by hand and without the use of tools. The filter receiving device is a) a flat bottomed stand; b) a carrying device; or c) an adapter.

20 Claims, 42 Drawing Sheets

(51) Int. Cl.

| | |
|---|---|
| *B01D 29/085* | (2006.01) |
| *B01D 29/31* | (2006.01) |
| *C02F 1/28* | (2006.01) |
| *C02F 1/42* | (2006.01) |
| *C02F 1/44* | (2006.01) |
| *C02F 1/50* | (2006.01) |
| *C02F 1/68* | (2006.01) |
| *C02F 1/76* | (2006.01) |
| *C02F 5/08* | (2006.01) |
| *C02F 101/10* | (2006.01) |
| *C02F 101/12* | (2006.01) |
| *C02F 101/20* | (2006.01) |
| *C02F 101/30* | (2006.01) |
| *C02F 101/32* | (2006.01) |

(52) U.S. Cl.
CPC ............... *C02F 1/281* (2013.01); *C02F 1/283* (2013.01); *C02F 1/288* (2013.01); *C02F 1/42* (2013.01); *C02F 1/444* (2013.01); *C02F 1/505* (2013.01); *C02F 1/68* (2013.01); *C02F 1/76* (2013.01); *C02F 5/08* (2013.01); *C02F 2101/103* (2013.01); *C02F 2101/12* (2013.01); *C02F 2101/20* (2013.01); *C02F 2101/305* (2013.01); *C02F 2101/306* (2013.01); *C02F 2101/322* (2013.01); *C02F 2201/004* (2013.01); *C02F 2201/006* (2013.01); *C02F 2303/02* (2013.01); *C02F 2303/04* (2013.01); *C02F 2303/22* (2013.01); *C02F 2307/04* (2013.01); *C02F 2307/06* (2013.01); *C02F 2307/10* (2013.01); *C02F 2307/12* (2013.01)

(56) References Cited

U.S. PATENT DOCUMENTS

| | | | |
|---|---|---|---|
| 1,674,203 A | 6/1928 | Holz et al. | |
| 3,727,764 A | 4/1973 | Ogden | |
| 3,823,824 A | 7/1974 | Close | |
| 4,072,243 A | 2/1978 | Conant et al. | |
| 4,283,283 A | 8/1981 | Zimmerman | |
| 4,419,235 A | 12/1983 | Sway | |
| 4,528,095 A | 7/1985 | Byrne | |
| 4,764,274 A | 8/1988 | Miller | |
| 4,828,692 A | 5/1989 | Peranio | |
| 4,867,875 A | 9/1989 | Peranio | |
| 4,948,499 A | 8/1990 | Peranio | |
| 4,999,109 A | 3/1991 | Sabre | |
| 5,049,272 A | 9/1991 | Nieweg et al. | |
| 5,318,703 A | 6/1994 | Heiligman | |
| 5,328,597 A | 7/1994 | Bolt et al. | |
| 5,393,548 A | 2/1995 | Heiligman | |
| 5,411,661 A | 5/1995 | Heiligman | |
| 5,652,008 A | 7/1997 | Heiligman | |
| 5,656,160 A | 8/1997 | Parise et al. | |
| 5,826,493 A | 10/1998 | Tien Lin | |
| 5,846,418 A | 12/1998 | Thompson et al. | |
| 5,914,045 A | 6/1999 | Palmer et al. | |
| 6,024,867 A | 2/2000 | Parise | |
| 6,074,550 A | 6/2000 | Hofmann et al. | |
| 6,241,893 B1* | 6/2001 | Levy .................... | A23L 2/72 204/157.44 |
| 6,290,847 B1 | 9/2001 | Cutler | |
| 6,428,687 B1 | 8/2002 | Moretto | |
| 6,454,941 B1 | 9/2002 | Cutler et al. | |
| D496,429 S | 9/2004 | Donnelly | |
| 6,818,130 B1 | 11/2004 | Varriale et al. | |
| 7,094,334 B1 | 8/2006 | Guzman et al. | |
| 7,163,625 B1 | 1/2007 | Williamson et al. | |
| 7,294,277 B2 | 11/2007 | Moretto | |
| 7,309,418 B2 | 12/2007 | Joyce et al. | |
| 7,585,409 B2 | 9/2009 | Bommi et al. | |
| D602,558 S | 10/2009 | Beams et al. | |
| 7,678,282 B2 | 3/2010 | Moretto | |
| D617,868 S | 6/2010 | Leavitt et al. | |
| 7,836,708 B2 | 11/2010 | Krause et al. | |
| 7,862,720 B2 | 1/2011 | Brown | |
| D657,844 S | 4/2012 | Smiedt et al. | |
| D666,865 S | 9/2012 | Spivey et al. | |
| 2005/0252929 A1 | 11/2005 | Bond | |
| 2007/0045302 A1 | 3/2007 | Fujii et al. | |
| 2008/0116146 A1 | 5/2008 | Harrington et al. | |
| 2009/0199722 A1 | 8/2009 | Bodum | |
| 2010/0044284 A1 | 2/2010 | Scholz | |
| 2010/0084347 A1 | 4/2010 | Wilder et al. | |
| 2010/0206799 A1* | 8/2010 | Leavitt .................... | C02F 1/002 210/314 |
| 2011/0303589 A1 | 12/2011 | Kuennen et al. | |
| 2012/0055862 A1 | 3/2012 | Parekh et al. | |
| 2012/0148707 A1 | 6/2012 | Lackey et al. | |

FOREIGN PATENT DOCUMENTS

| | | |
|---|---|---|
| GB | 2196329 A | 4/1988 |
| GB | 2200902 A | 8/1988 |
| GB | 2441981 A | 3/2008 |
| RU | 45217 S | 3/1999 |
| WO | 9740906 | 11/1997 |
| WO | 2006110632 A2 | 10/2006 |
| WO | 2007021686 A2 | 2/2007 |
| WO | 2010010572 A2 | 1/2010 |
| WO | 2010080288 A2 | 7/2010 |
| WO | 2011013142 A2 | 2/2011 |
| WO | 2011145646 A1 | 11/2011 |

OTHER PUBLICATIONS

Zumreed Rain Drop LED Bathroom Light, online article by Liszewski, Andrew on May 14, 2007, website www.ohgizmo.com.
Zumreed Drop—Showering With Your iPod., Copyright One Piece Discoveries Science and Tech Blog 2009-2010.
http://www.somawater.co/ (web page Dec. 2012).
http://www.kickstarter.com/projects/zachallia/soma-beautifully-innovative-all-natural-water-filt (web page Dec. 2012).
International Patent Application No. PCT/US2013073118, filed Dec. 4, 2013, Applicant: Whirlpool Corporation, International Search Report and Written Opinion re: Same, mail date: Apr. 17, 2014.
International Patent Application No. PCT/US2013073126, filed Dec. 4, 2013, Applicant: Whirlpool Corporation, International Search Report and Written Opinion re: Same, mail date: Apr. 17, 2014.
International Patent Application No. PCT/US2013073112, filed Dec. 4, 2013, Applicant: Whirlpool Corporation, International Search Report and Written Opinion re: Same, mail date: Apr. 17, 2014.
International Patent Application No. PCT/US2013073138, filed Dec. 4, 2013, Applicant: Whirlpool Corporation, International Search Report and Written Opinion re: Same, mail date: Apr. 17, 2014.
International Patent Application No. PCT/US2013073149, filed Dec. 4, 2013, Applicant: Whirlpool Corporation, International Search Report and Written Opinion re: Same, mail date: Apr. 17, 2014.
European Patent Office, "Extended European Search Report," issued in connection with European Patent Application No. 13860420.2-1370, mailed Jul. 6, 2016, 4 pages.
European Patent Office, "Extended European Search Report," issued in connection with European Patent Application No. 13861238.7-1370, mailed Jul. 6, 2016, 4 pages.

(56) References Cited

OTHER PUBLICATIONS

European Patent Office, "Supplementary Extended European Search Report," issued in connection with European Patent Application No. 13860420.2-1370, mailed Jul. 13, 2016, 11 pages.
European Patent Office, "Extended European Search Report," issued in connection with European Patent Application No. 13860848.4-1370, mailed Jul. 13, 2016, 5 pages.

\* cited by examiner

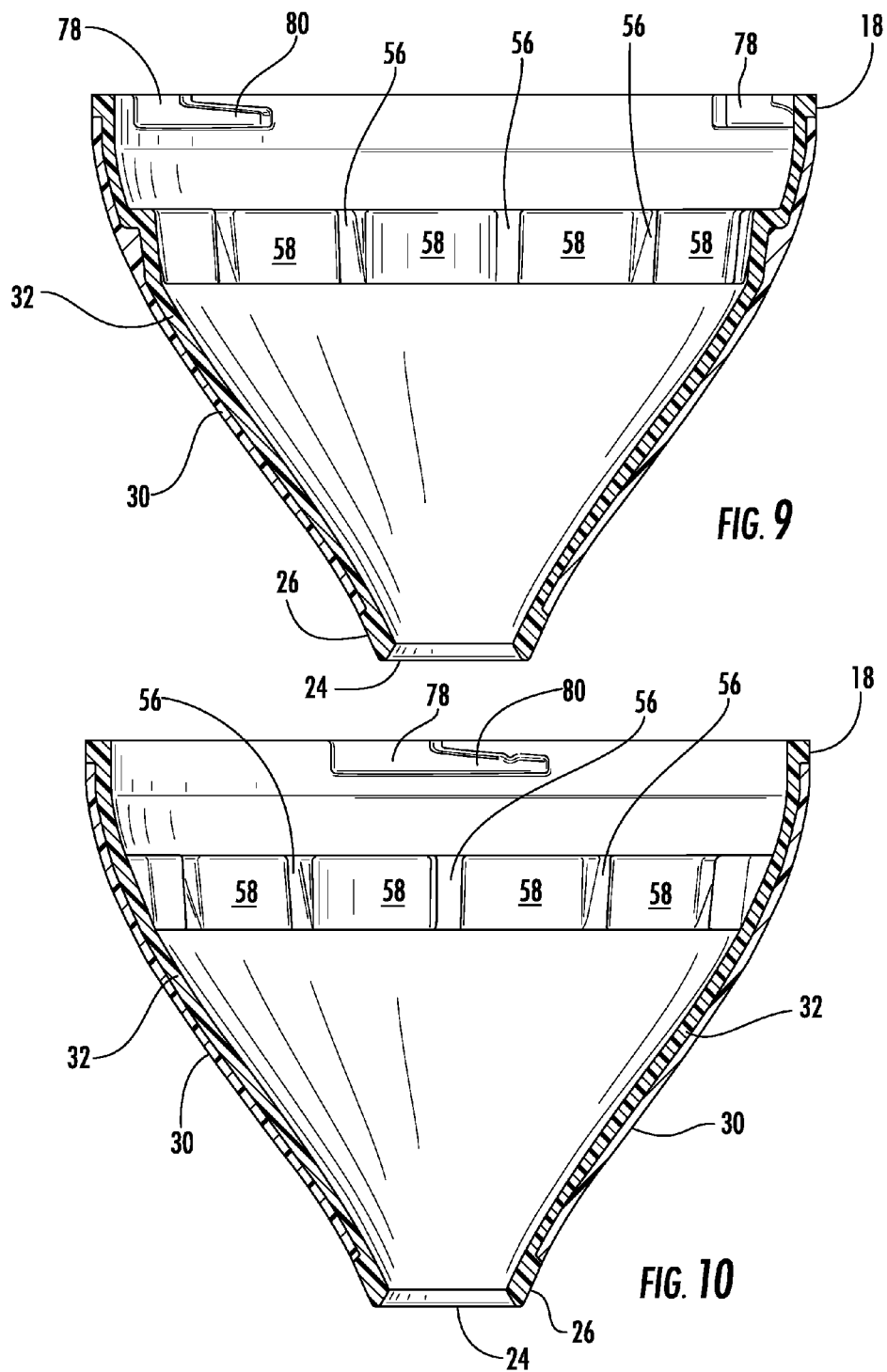

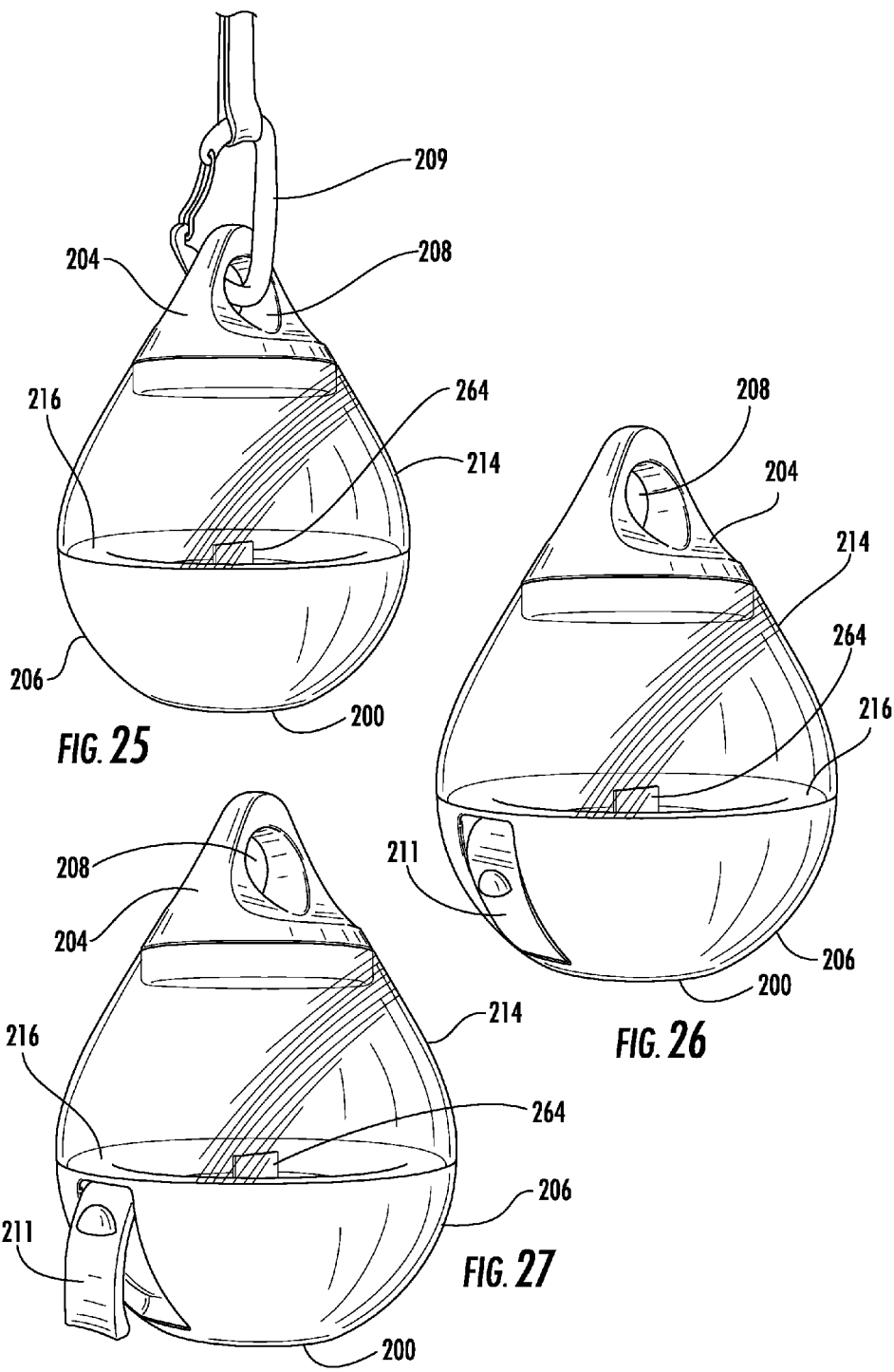

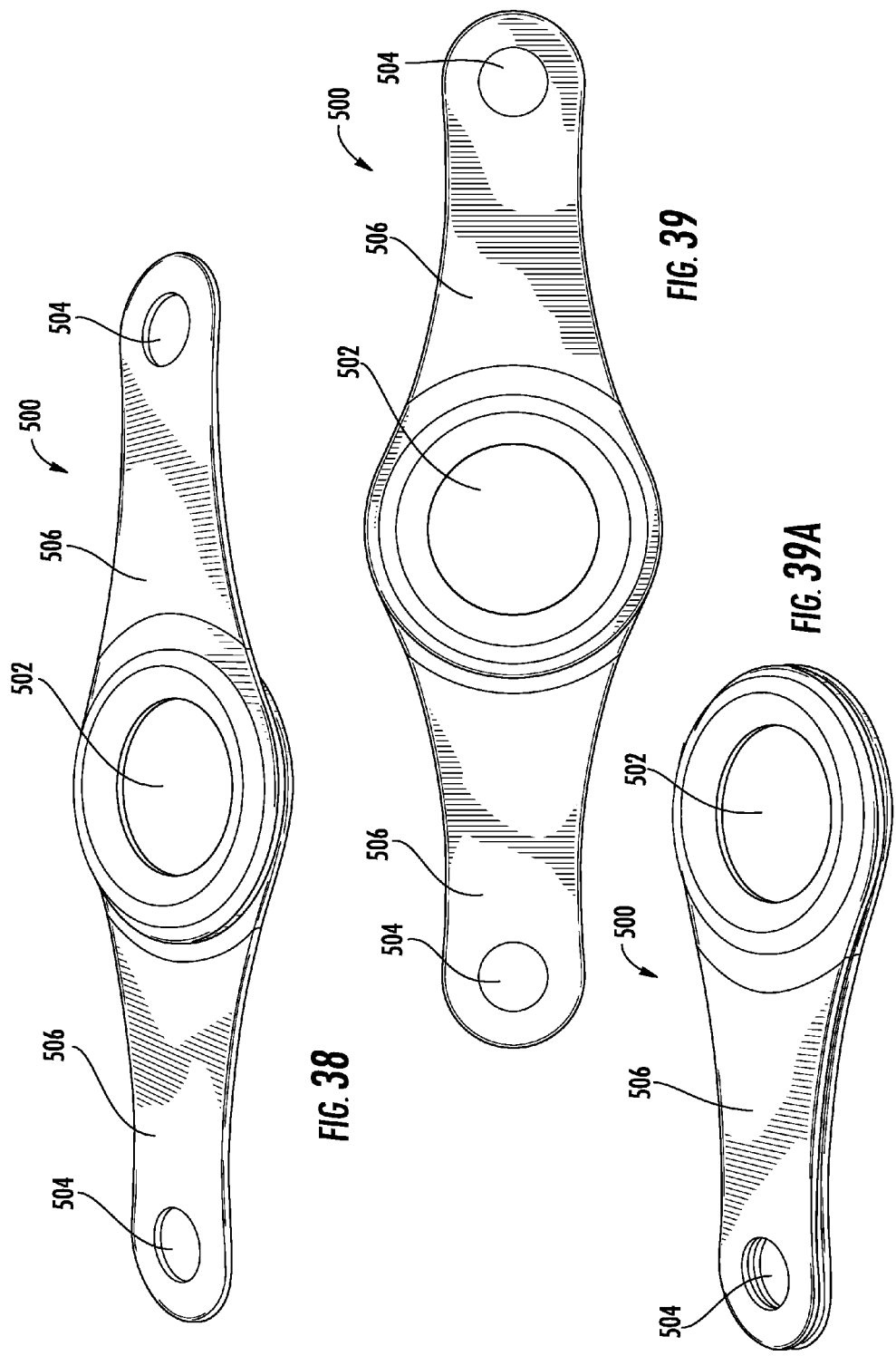

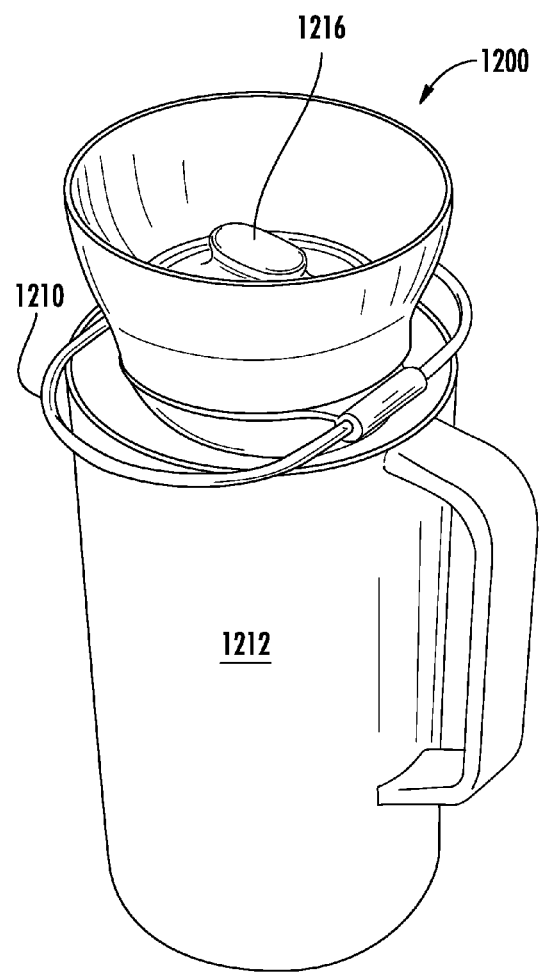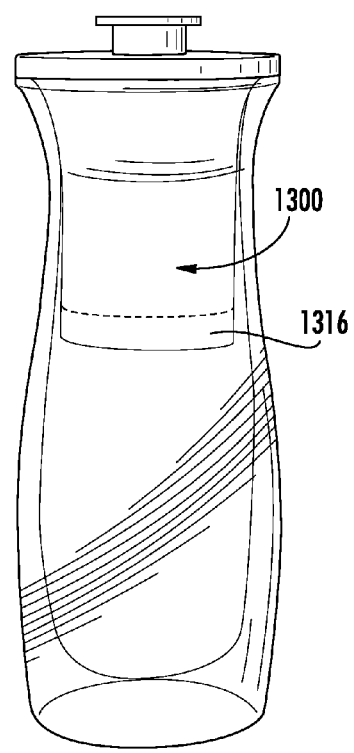
FIG. 49
FIG. 50

FILTER ASSEMBLY AND SYSTEMS/METHODS OF DISPENSING FROM AND STORING THE FILTER ASSEMBLY

CROSS-REFERENCE TO RELATED APPLICATION

This application claims priority to and the benefit of U.S. Provisional Patent Application Ser. No. 61/733,020, filed on Dec. 4, 2012, entitled Water Filtration/Treatment System, the entire disclosure of which is hereby incorporated by reference.

SUMMARY OF THE DISCLOSURE

An aspect of the present invention includes a gravity-driven water filtering system that includes: a gravity-driven water filter configured to engage and deliver treated water through apertures of various sizes and a filter receiving device. The gravity-driven water filter includes a bottom portion, a water filter and a top portion. The bottom portion has at least one treated water outlet, an upper perimeter, and a bottom portion side wall that defines an interior volume of the bottom portion. The bottom portion side wall is a shaped surface configured to frictionally engage a plurality of differently sized water vessel openings and still allow treated water to be delivered to the interior of a water vessel through the at least one treated water outlets. The water filter includes a water treatment medium positioned within the water filter. The water filter is operably engaged with the bottom portion and has a water intake location and a water outgoing location that delivers treated water to the interior volume of the bottom portion and out of the at least one treated water outlet of the bottom portion. The top portion has an interior volume defined by at least one wall, at least one water inlet, and a bottom perimeter defining an opening. The top portion is configured to received water from at least one water inlet and the bottom perimeter defines an opening configured to allow water from the at least one inlet to flow into contact with an intake surface of the water filter.

The water filter is configured to be removably engaged by hand without the use of tools from the bottom portion and the water filter. Moreover, the bottom portion and the top portion are each configured to be removably engaged and disengaged to allow for replacement of the filter and reassembly of the overall gravity-driven water filter by hand and without the use of tools.

The filter receiving device is a filter receiving device chosen from the following: a) a flat bottomed stand that receives the top portion of the gravity-driven water filter where the stand has a top portion receiving center section insert that has the same shape as the top portion such that the top portion matingly engages the top portion receiving center section insert. The top portion receiving center section insert is detachable from a perimeter stand portion positioned about a perimeter of the top portion receiving center section insert when engaged therewith; b) a manual carrying device that engages the filter and includes at least one carrying aperture; or c) an adapter configured to either (1) provide the ability for the gravity-driven water filter to deliver treated water to a vessel having a aperture larger than the width of the gravity-driven water filter or (2) engage a side wall of the vessel and suspend the gravity-driven water filter from a side wall over an aperture larger than the width of the gravity-driven water filter.

Yet another aspect of the present invention includes a gravity-driven water filtering system that includes: a gravity-driven water filter configured to engage and deliver treated water through apertures of various sizes and a filter receiving device. The gravity-driven water filter includes a bottom portion, a water filter and a top portion. The bottom portion has at least one treated water outlet, an upper perimeter, and a bottom portion side wall that defines an interior volume of the bottom portion. The bottom portion side wall is a shaped surface configured to frictionally engage a plurality of differently sized water vessel openings and still allow treated water to be delivered to the interior of a water vessel through the at least one treated water outlets. The water filter includes a water treatment medium positioned within the water filter. The water filter is operably engaged with the bottom portion and has a water intake location and a water outgoing location that delivers treated water to the interior volume of the bottom portion and out of the at least one treated water outlet of the bottom portion. The top portion has an interior volume defined by at least one wall, at least one water inlet, and a bottom perimeter defining an opening. The top portion is configured to received water from at least one water inlet and the bottom perimeter defines an opening configured to allow water from the at least one inlet to flow into contact with an intake surface of the water filter.

The water filter is configured to be removably engaged by hand without the use of tools from the bottom portion and the water filter. Moreover, the bottom portion and the top portion are each configured to be removably engaged and disengaged to allow for replacement of the filter and reassembly of the overall gravity-driven water filter by hand and without the use of tools. The gravity-driven water treatment medium allows for a water flow rate of at least about one liter or at least about two liters per minute of flow through the water treatment medium under a force of gravity.

The filter receiving device is a filter receiving device chosen from the following: a) a flat bottomed stand that receives the top portion of the gravity-driven water filter where the stand has a top portion receiving center section insert that has the same shape as the top portion such that the top portion matingly engages the top portion receiving center section insert. The top portion receiving center section insert is detachable from a perimeter stand portion positioned about a perimeter of the top portion receiving center section insert when engaged therewith; b) a manual carrying device that engages the filter and includes at least one carrying aperture; or c) an adapter configured to either (1) provide the ability for the gravity-driven water filter to deliver treated water to a vessel having a aperture larger than the width of the gravity-driven water filter or (2) engage a side wall of the vessel and suspend the gravity-driven water filter from a side wall over an aperture larger than the width of the gravity-driven water filter.

Another aspect of the present invention includes a gravity-driven water filtering system having: a gravity-driven water filter configured to engage and deliver treated water through apertures of various sizes and a filter receiving device. The gravity-driven water filter includes a bottom portion, a water filter and a top portion. The bottom portion has at least one treated water outlet, an upper perimeter, and a bottom portion side wall that defines an interior volume of the bottom portion. The bottom portion side wall is a shaped surface that is configured to frictionally engage a plurality of differently sized water vessel openings and still allow treated water to be delivered to the interior of a water (liquid) vessel through the at least one treated water (liquid) outlets of the bottom portion of the gravity-driven water treatment device.

The bottom portion further includes an overmolded material matingly engaged with a host component of the bottom portion. The overmolded material is typically a plastic or elastomeric material that is a separate component from the host component.

The water filter includes a water treatment medium positioned within the water filter. The filter is operably engaged with the bottom portion and has a water intake location and a water outgoing location that delivers treated water to the interior volume of the bottom portion and out of the at least one treated water outlet of the bottom portion. The water filter is configured to reduce chlorine taste and odor components (CTO) per NSF 42 to a minimum of 60 gallons and allows for a water flow rate of at least about one liter per minute of flow through the water treatment medium under a force of gravity alone. The water filter includes a water filter housing with an interior volume containing the water treatment medium positioned within the water filter housing. The water filter housing includes a top surface with a plurality of apertures for receiving water through the top surface and into contact with the water treatment medium, a bottom surface with a plurality of apertures for delivering treated water to the bottom portion, and at least one perimeter wall extending between the top surface and the bottom surface. The at least one perimeter wall has an exterior surface and at least one outwardly projecting lip positioned between the bottom surface of the water treatment housing and about ½ or about ⅔ of the distance up from the bottom surface toward the top surface of the water filter housing. The outwardly projecting lip rests upon a shelf on the interior of the bottom portion and extending inwardly toward the interior of the bottom portion.

The top portion has an interior volume defined by at least one wall forming a curved exterior, at least one water inlet, and a bottom perimeter defining an opening. The top portion is configured to received water from at least one water inlet and the bottom perimeter defines an opening that is configured to allow water from the at least one inlet to flow into contact with an intake surface of the water filter.

The water filter is configured to be removably engaged by hand without the use of tools from the bottom portion and the fluid filter, the bottom portion and the top portion are each configured to be removably engaged and disengaged to allow for replacement of the filter and reassembly of the overall gravity-driven filter by hand and without the use of tools. The water filter housing is typically cylindrically shaped and further includes at least one or a plurality of tabular members extending downward from the outwardly projecting lip and away from the at least one perimeter wall. The bottom portion further includes a plurality of spaced apart tabular members that extend into the interior volume of the bottom portion and define spaces therebetween that are configured to receive the tabular members of the filter housing. The tabular members have an upper shelf extending into the interior of the bottom portion and tapered sides extending downward toward the treated water outlet of the bottom portion. The at least one perimeter wall has at least one visible indicator thereon that is visible through a cutout portion of the bottom portion of the gravity water treatment device.

The filter receiving device is a filter receiving device chosen from the following: a) a flat bottomed stand that receives the top portion of the gravity-driven water filter where the stand has a top portion receiving center section insert that has the same shape as the top portion such that the top portion matingly engages the top portion receiving center section insert. The top portion receiving center section insert is detachable from a perimeter stand portion positioned about the perimeter of the top portion receiving center section insert when engaged therewith; b) a manual carrying device that engages the filter and includes at least one carrying aperture; or c) an adapter configured to either (1) provide the ability for the gravity-driven water filter to deliver treated water to a vessel having a aperture larger than the width of the gravity-driven water filter or (2) engage a side wall of the vessel and suspend the gravity-driven water filter from a side wall over an aperture larger than the width of the gravity-driven water filter.

These and other features, advantages, and objects of the present disclosure will be further understood and appreciated by those skilled in the art by reference to the following specification, claims, and appended drawings.

BRIEF DESCRIPTION OF THE DRAWINGS

FIG. 9 is a cross-sectional view of the bottom funnel portion taken along lines IX-IX in FIG. 8;

FIG. 10 is a cross-sectional view of the bottom funnel portion taken along lines X-X in FIG. 8;

FIG. 25 is a perspective view of a drop-shaped gravity water filter according to an aspect of the present disclosure having a carrier aperture in the top engaged to a hook;

FIG. 26 is a perspective view of a drop-shaped gravity filter assembly according to an aspect of the present disclosure with a pot or beverage rim engagement mechanism within the bottom portion of the drop-shaped gravity filter assembly in the closed position;

FIG. 27 is a perspective view of a drop-shaped gravity filter assembly according to an aspect of the present disclosure with a pot or beverage rim engagement mechanism within the bottom portion of the drop-shaped gravity filter assembly in the open position;

FIG. 38 is a perspective view of the filter suspension device;

FIG. 39 is a top view of the filter suspension device of FIG. 38;

FIG. 39A is a perspective view of the filter suspension device of FIG. 38 in a folded position;

FIG. 49 is an alternative embodiment of the gravity filter assembly of the present disclosure suspended using a substantially elliptical frame to suspend the gravity filter assembly over the opening of the vessel;

FIG. 50 is an elevated front view of a vessel with the filter spaced within an adapter that extends into the vessel;

DETAILED DESCRIPTION

Figure 1:
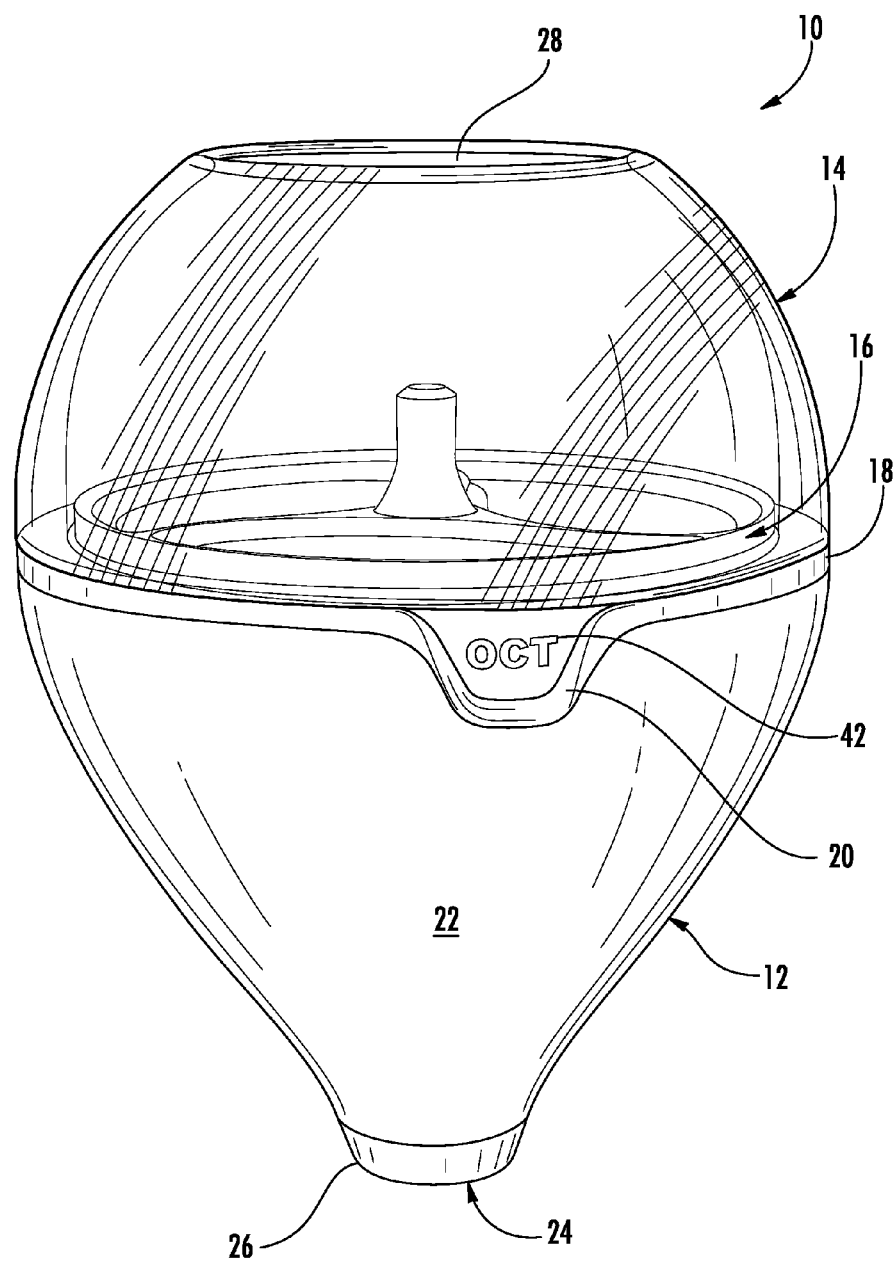
FIG. 1 is a front prospective view of a drop-shaped gravity filter assembly according to an aspect of the present disclosure.
Figure 2:
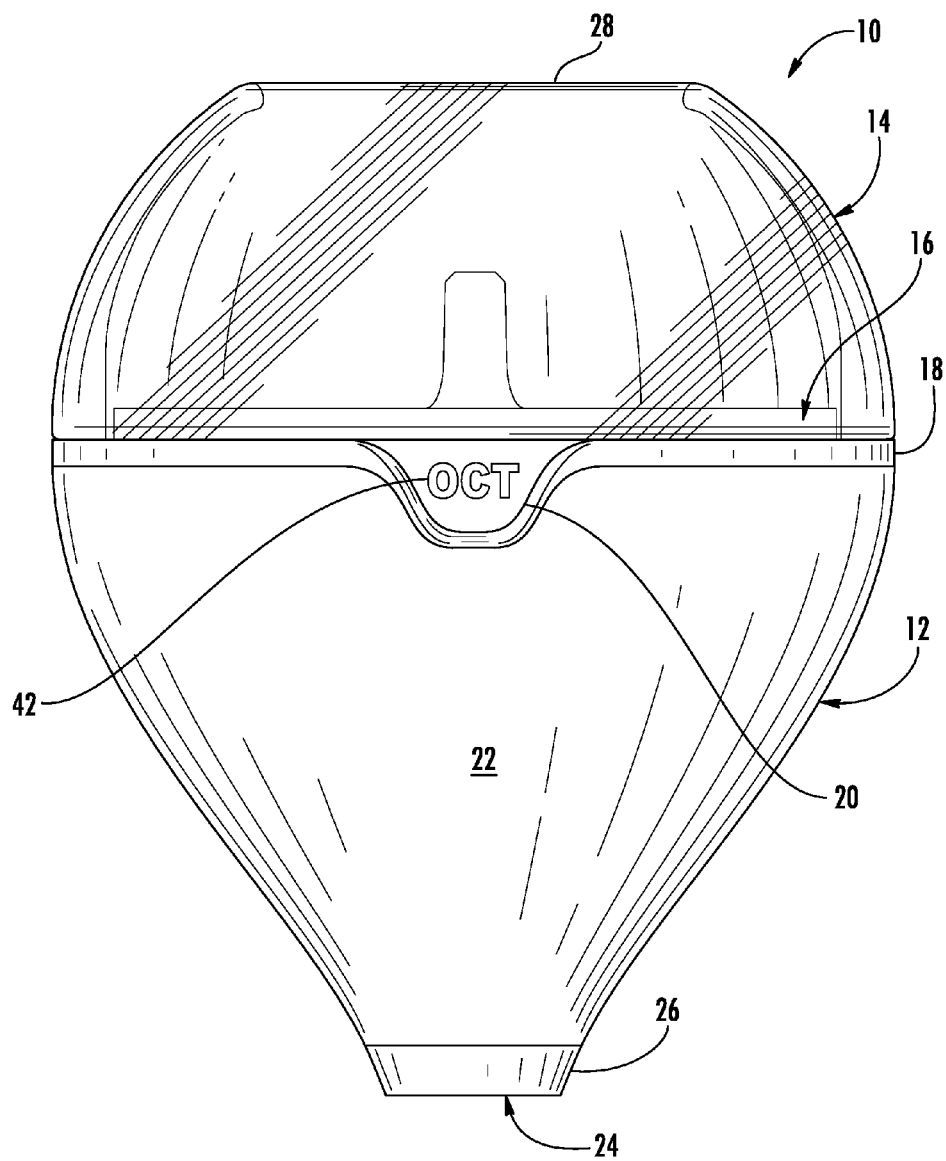
FIG. 2 is an elevated front view of a drop-shaped gravity filter assembly according to an aspect of the present disclosure.
Figure 3:
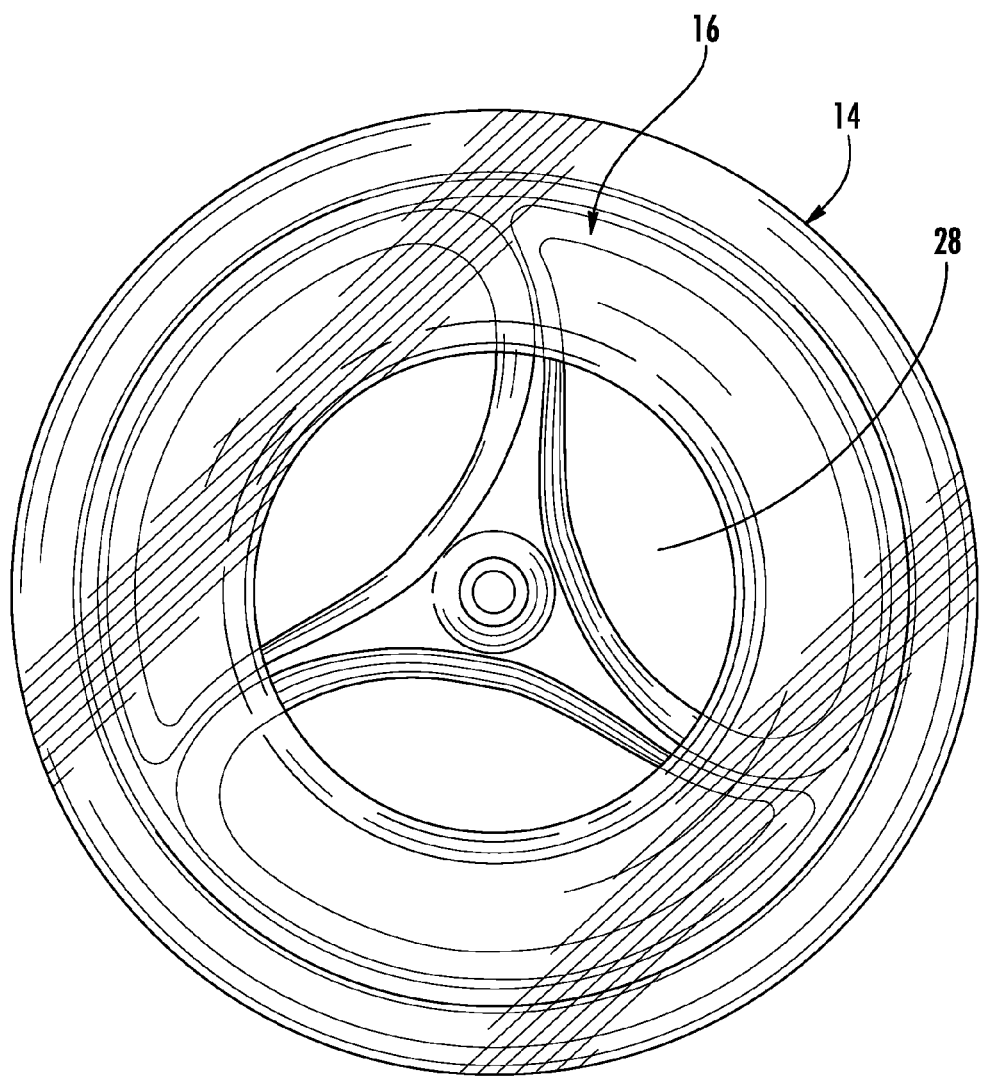
FIG. 3 is a top view of a drop-shaped gravity filter assembly according to an aspect of the present disclosure.
Figure 4:
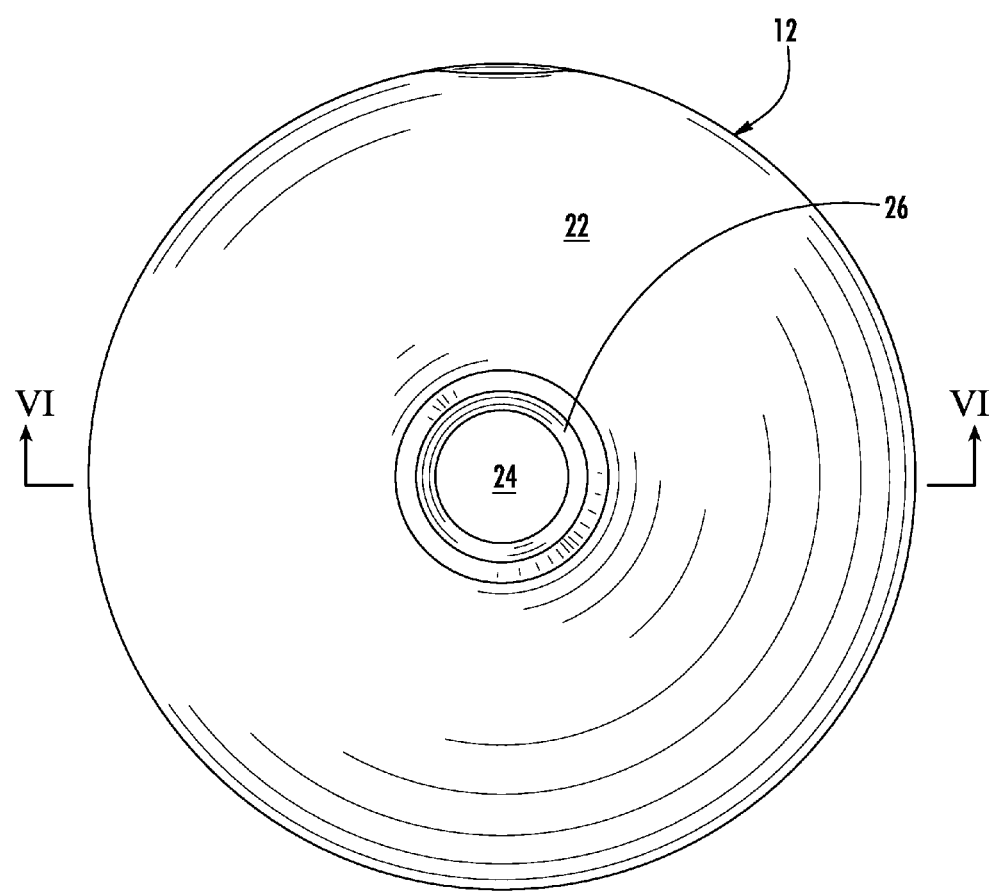
FIG. 4 is a bottom view of a drop-shaped gravity filter assembly according to an aspect of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It will be understood by one having ordinary skill in the art that construction of the described disclosure and other components is not limited to any specific material. Other exemplary embodiments of the disclosure disclosed herein may be formed from a wide variety of materials, unless described otherwise herein. In this specification and the amended claims, the singular forms "a," "an," and "the" include plural reference unless the context clearly dictates otherwise.

Where a range of values is provided, it is understood that each intervening value, to the tenth of the unit of the lower limit unless the context clearly dictates otherwise, between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

FIGS. 1-4 show an assembled gravity filter assembly of an aspect of the present disclosure, which filters liquid (water) by using only gravity instead of water pressure to drive the water through the filter assembly and the treatment medium. The gravity filter assembly is generally drop-shaped design, but conceivably could be any shape such as a cylinder-shaped design. The gravity filter assembly 10 may treat any fluid, but typically would be used to filter and/or treat water. The drop shaped gravity filter assembly 10 typically has at least a bottom funnel portion 12, a top cap portion 14, and a filter 16. The bottom funnel portion typically has a perimeter 18 that operably engages the filter 16 and the top cap portion when the components are assembled for use. The bottom funnel portion typically, but optionally, has a cutout portion 20 that allows for a portion of the exterior of the filter to show through and be visible to a user of the drop-shaped gravity filter. The outside surface 22 of the bottom funnel portion 12 typically has a curvilinear perimeter path that terminates at a liquid outlet 24, typically a water outlet, at the base 26 of the bottom funnel portion 12. The bottom funnel portion is conically shaped and tapers smoothly following the curvilinear path from the perimeter, which is typically circular, to the base 26. The bottom funnel portion 12, the top cap portion 14, and the filter 16 are typically constructed of a polymeric (plastic) material, but could also be constructed of glass or other material as well. The material may be opaque, translucent, or transparent. Typically, the bottom funnel portion 12 is opaque and the top cap portion 14 is transparent or translucent. The top cap portion typically has a liquid receiving aperture 28, which is typically circular, at the upper surface of the top cap section. The aperture 28 is typically sized to at least receive a given amount of water flow, which may be a water flow from a faucet.

Figure 5:
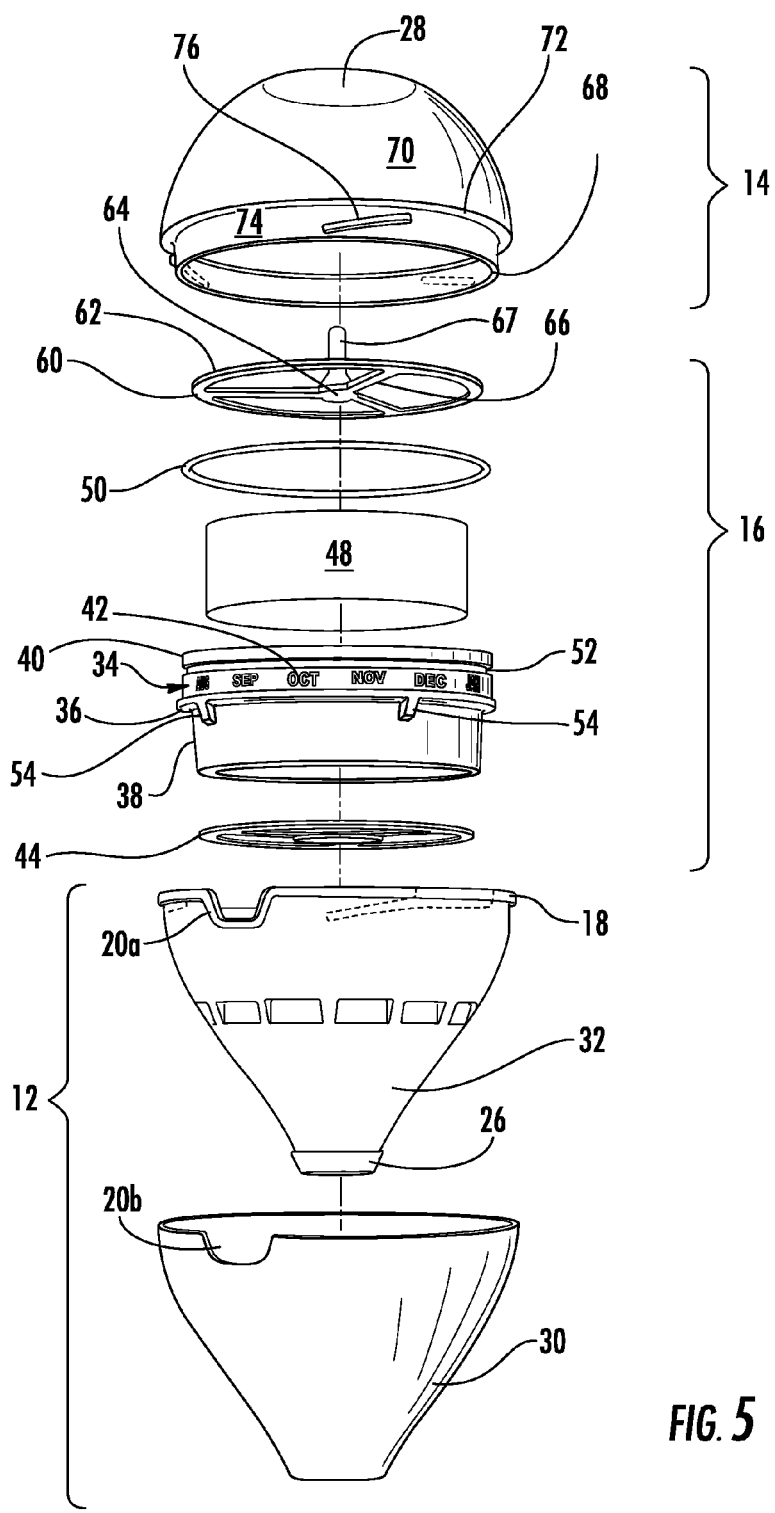
FIG. 5 is an exploded view of a drop-shaped gravity filter assembly according to an aspect of the present disclosure.
Figure 5A:
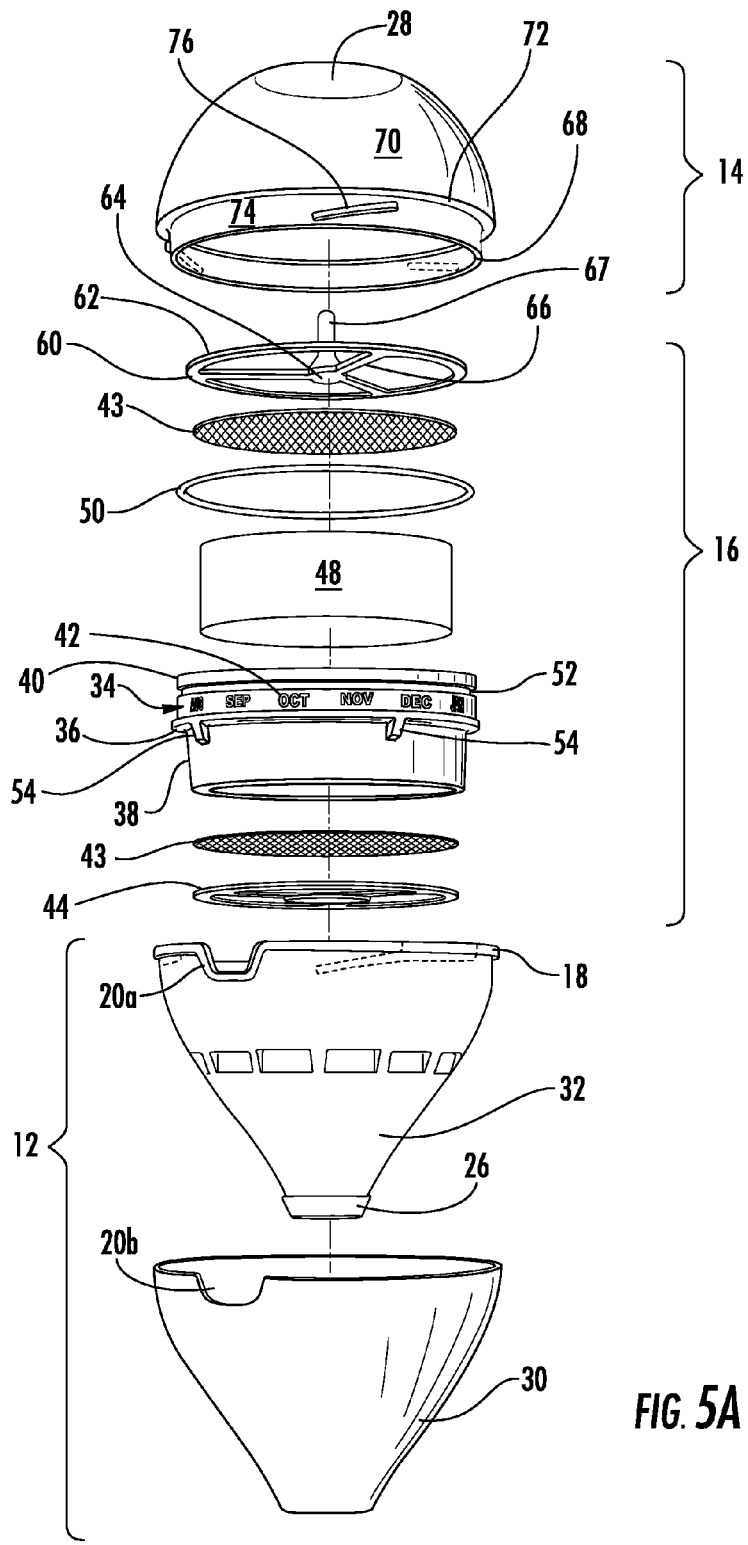
FIG. 5A is an exploded view of a drop-shaped gravity filter assembly according to another aspect of the present disclosure.
Figure 6:
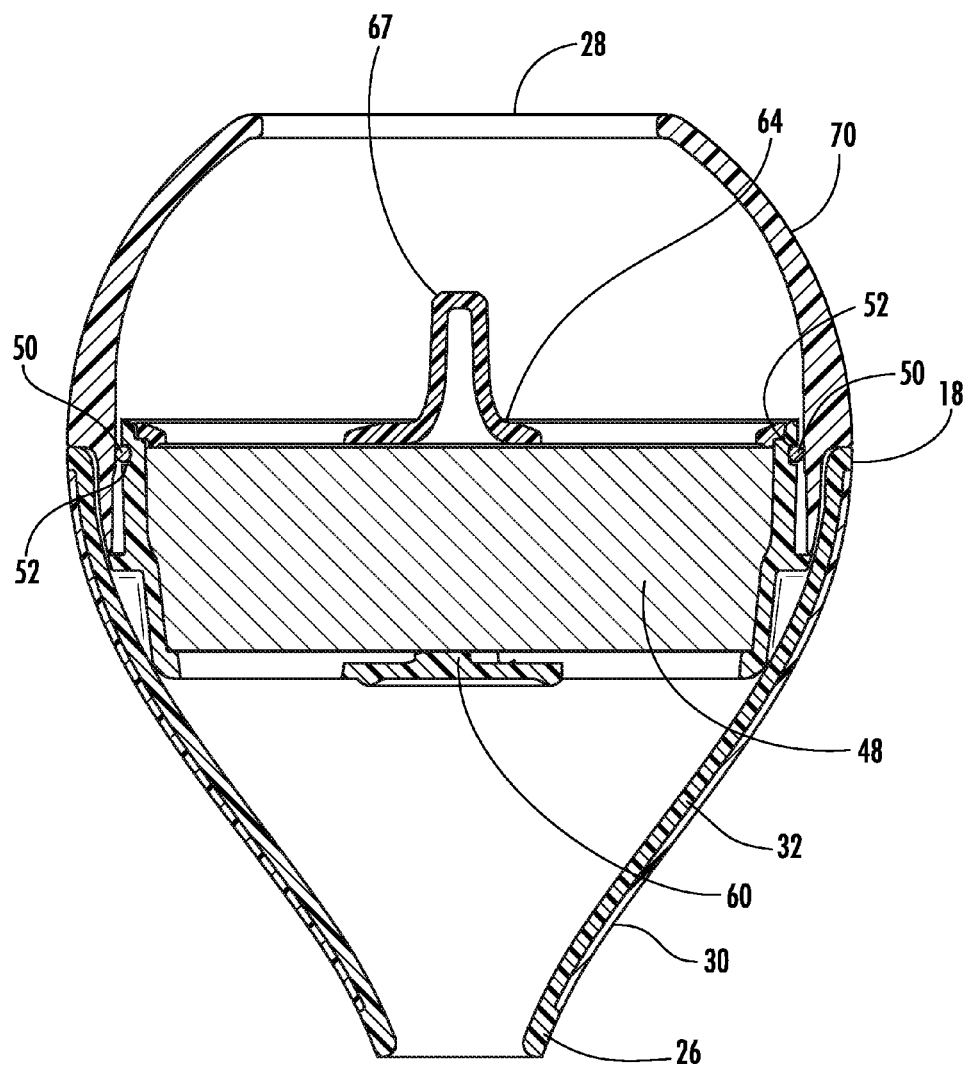
FIG. 6 is a cross-sectional view of a drop-shaped gravity filter assembly according to an aspect of the present disclosure taken along the plain of VI-VI in FIG. 4.

FIGS. 5 and 5A show exploded views of embodiments of the gravity filter assembly 10 according to the present disclosure. The drop-shaped gravity filter assembly bottom portion 12 typically has an over-molded material 30, which is typically a plastic or an elastomeric material that facilitates gripping of the filter by the user and/or the vessel it may be engaged with during a filtering operation. The over-molded material 30 also typically has a cutout portion 20b that matches the cutout portion 20a of the host component 32 of the overall bottom funnel portion 12 when a cutout portion 20 is present as part of the bottom funnel portion 12.

An aspect of the filter 16 is also shown exploded in FIG. 5 and another in FIG. 5A. The filter typically has a side wall section 34. The side wall section 34 has an outwardly projecting lip 36 typically positioned about two-thirds of the way to the top of the side wall section. The outwardly projecting lip 36 is typically positioned proximate the bottom of the side wall section, but may be up to about ½ to about ⅔ up the side wall section such that it divides the side wall section into a bottom portion 38 and an upper portion 40. The upper portion may have at least one, but typically has a plurality of indicators 42. The indicators are typically visible within the cutout portion 20. They typically function to indicate to the user when the filter should be replaced. When the filter has a six month useful life, for example, and the user inserts the filter in April, the user should, in the embodiment shown, place the filter within the bottom funnel portion, such that it mates with the bottom portion and displays "OCT" through the cutout portion as shown. In addition, a version is conceived where the indication shows both the install and end of life month abbreviation through the cutout portion 20. Also, as shown in FIGS. 15A, 16A, 19A, and 20A and described in more detail later, the filter 16 may be shorter and have the section of the side wall with the indicators 42 removed. As shown in FIG. 5A, a mesh material, which typically is a stainless steel mesh screen or a plastic (polyethylene or polypropylene) mesh screen 43 may be integrated or engaged with the filter base 44 and the filter top 60 as well.

Figure 15:
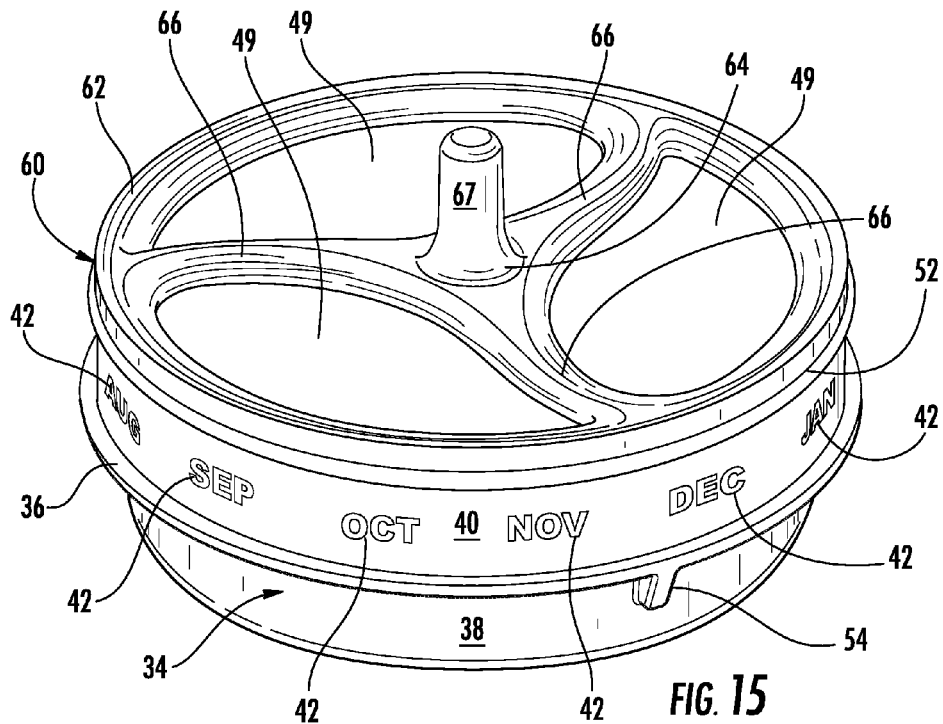
FIG. 15 is a front perspective view of the filter of the drop-shaped gravity filter assembly according to an aspect of the present disclosure.
Figure 16:
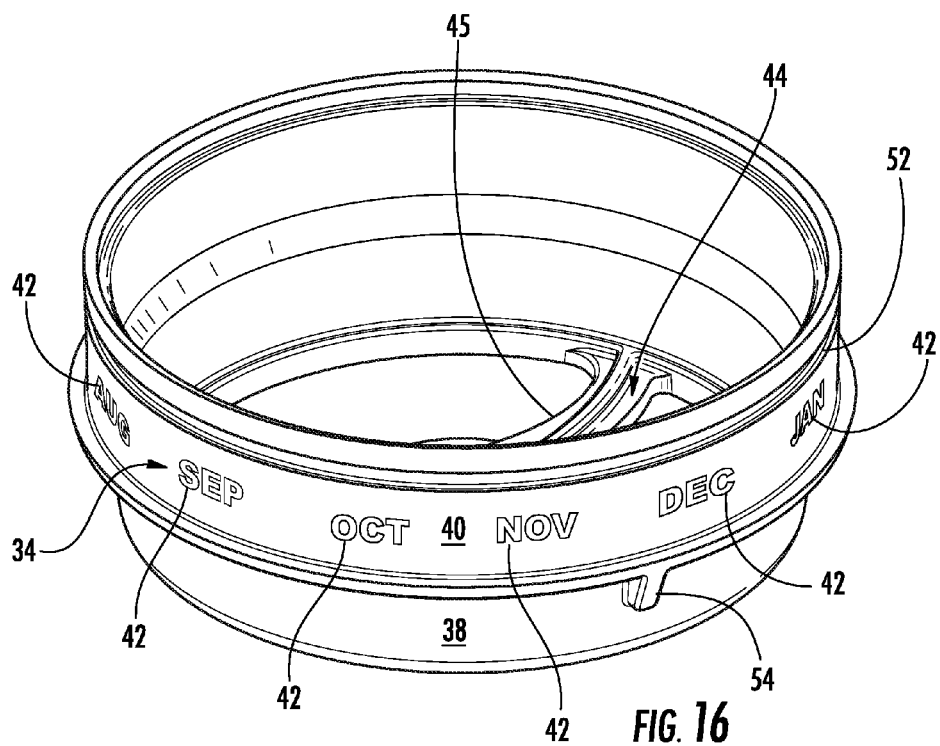
FIG. 16 is a front perspective view of the filter according to an aspect of the present disclosure with the top filter media retention element removed showing the interior of the filter.
Figure 15A:
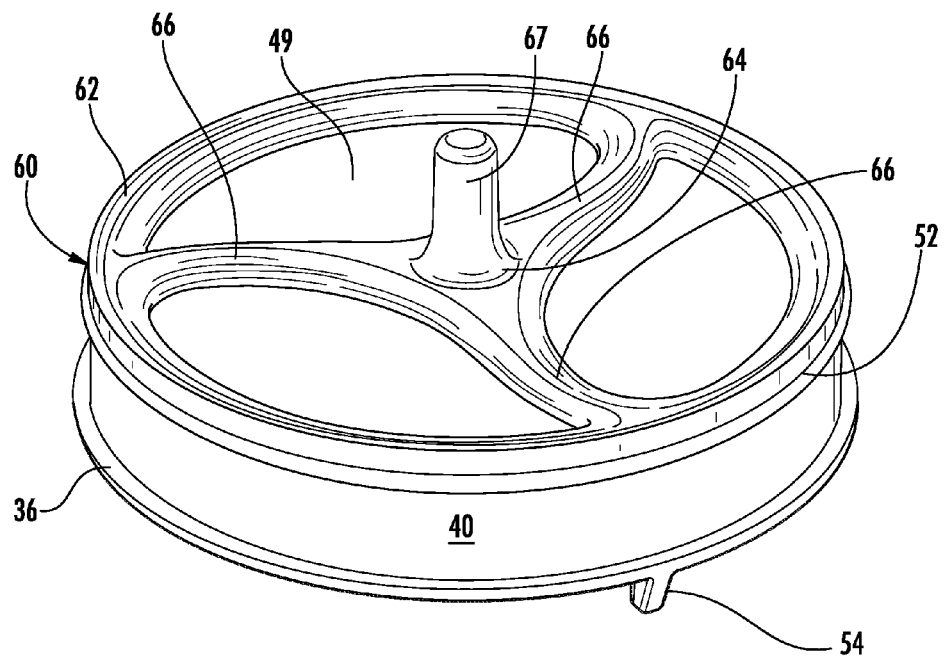
FIG. 15A is a front perspective view of the filter of the drop-shaped gravity filter assembly according to another aspect of the present disclosure.
Figure 16A:
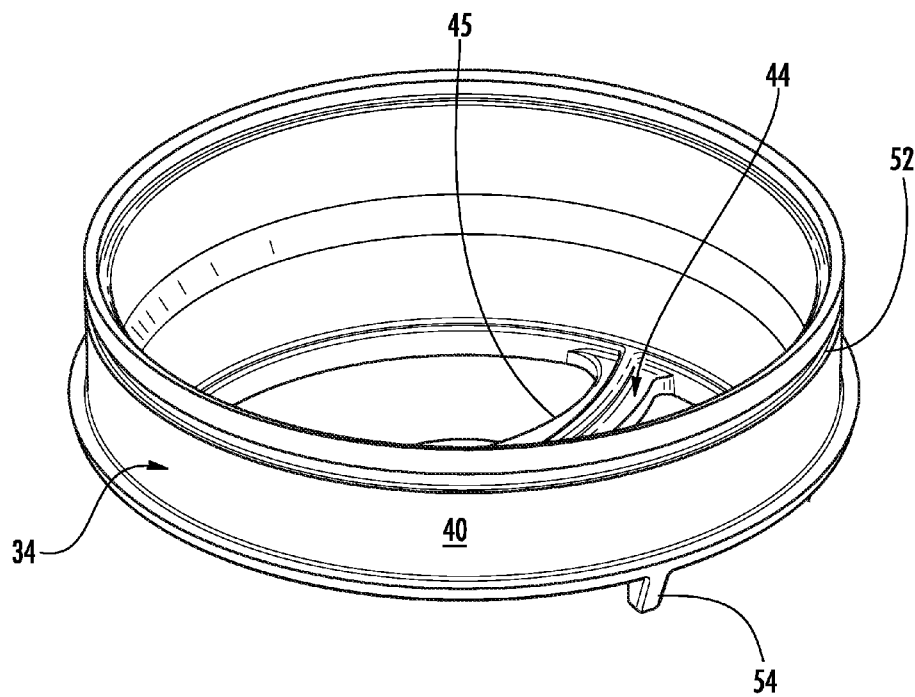
FIG. 16A is a front perspective view of the filter according to another aspect of the present disclosure with the top filter media retention element removed showing the interior of the filter.
Figure 17:
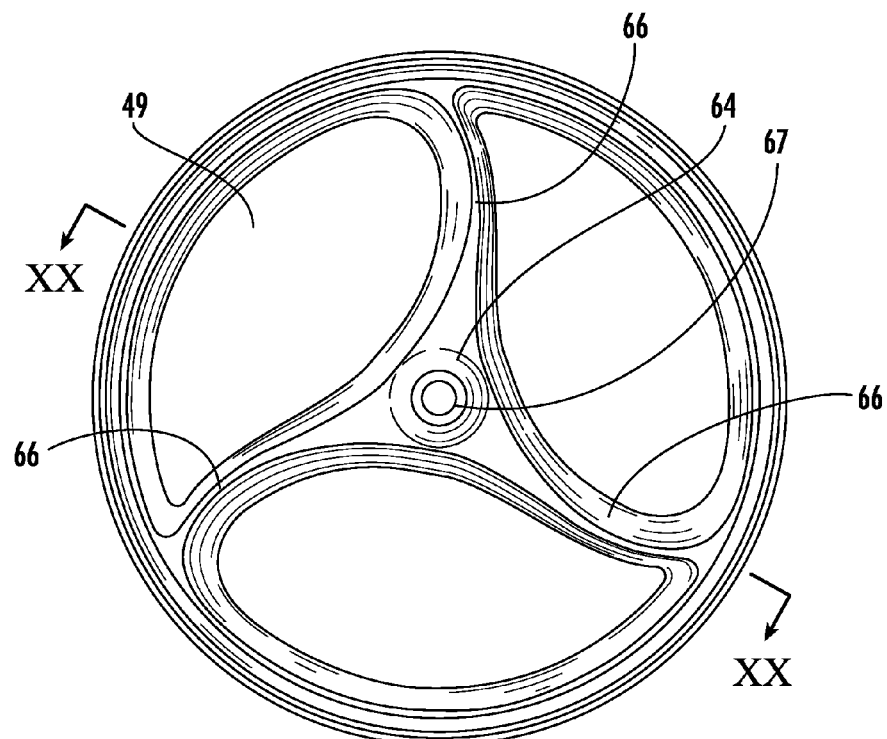
FIG. 17 is a top view of the filter according to an aspect of the present disclosure.
Figure 18:
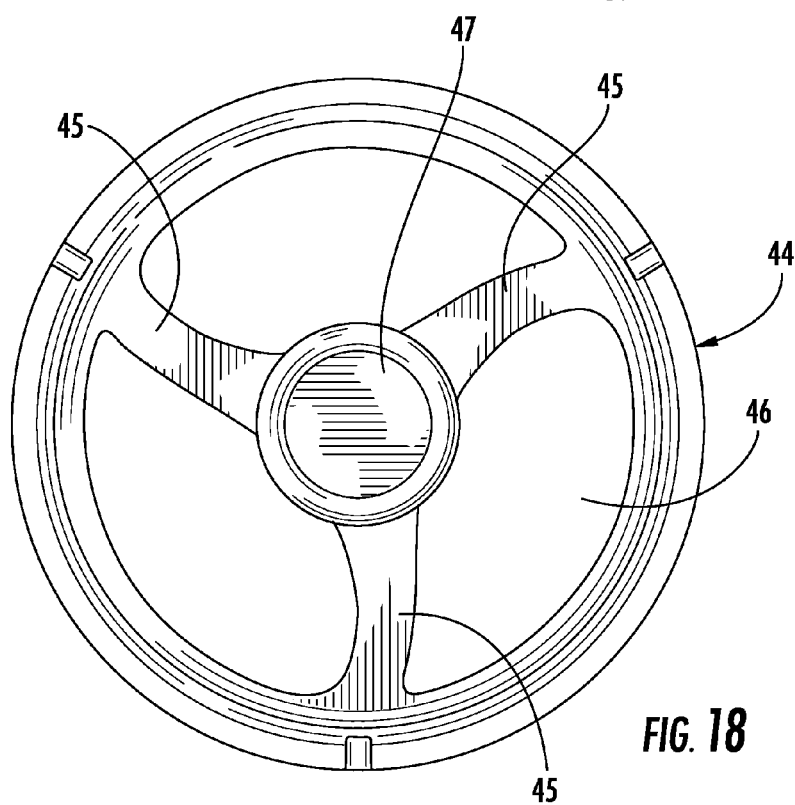
FIG. 18 is a bottom view of the filter according to an aspect of the present disclosure.
Figure 19:
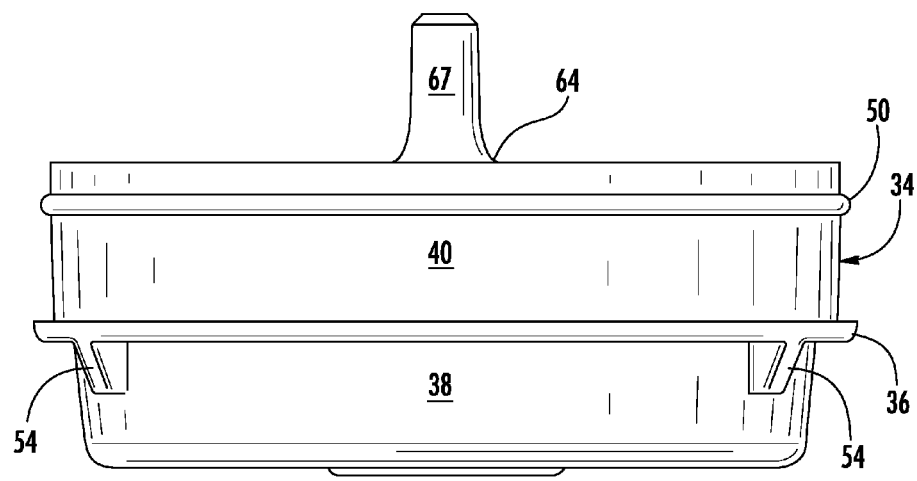
FIG. 19 is a side view of the filter according to an aspect of the present disclosure.
Figure 20:
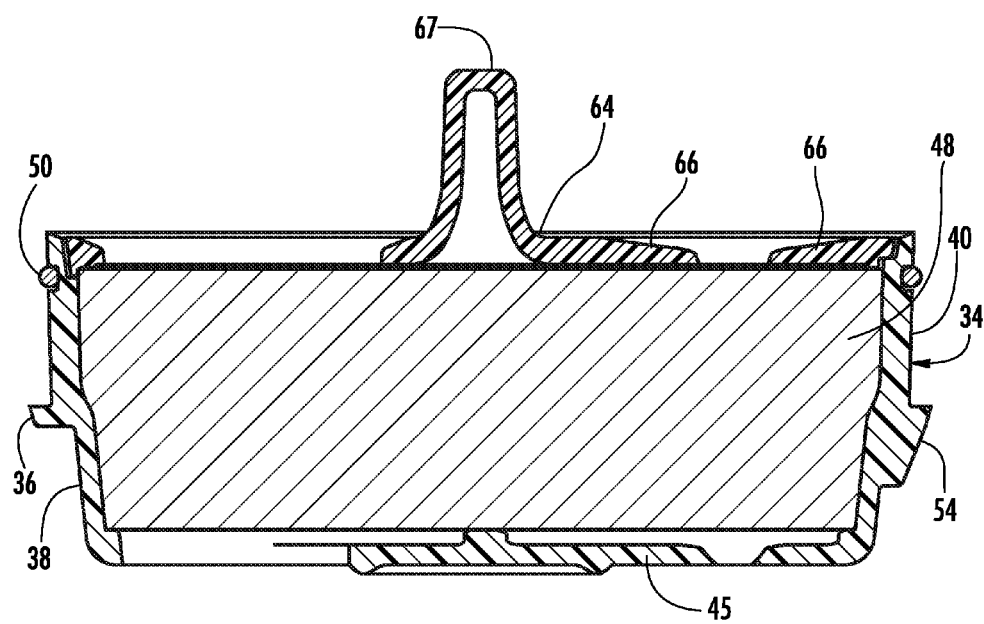
FIG. 20 is a cross-sectional view of the filter shown in FIG. 19 according to an aspect of the present disclosure taken along lines XX-XX in FIG. 17.
Figure 19A:
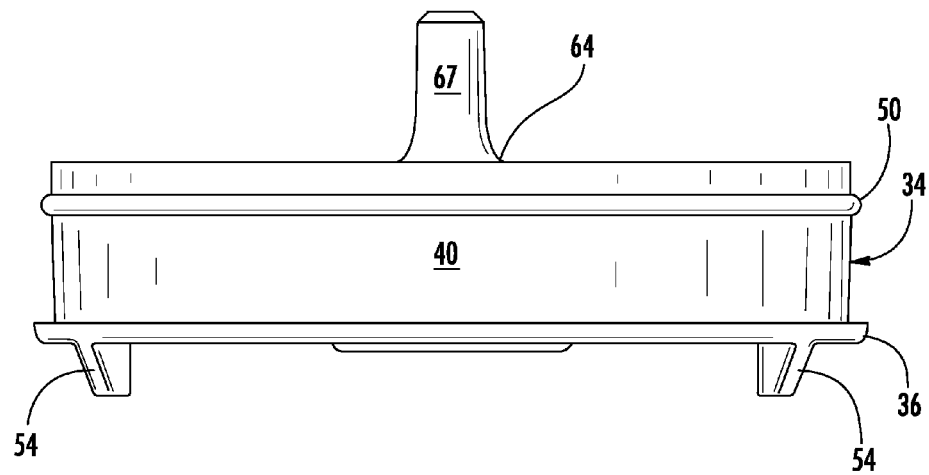
FIG. 19A is a reduced height version of the filter of FIG. 19.
Figure 20A:
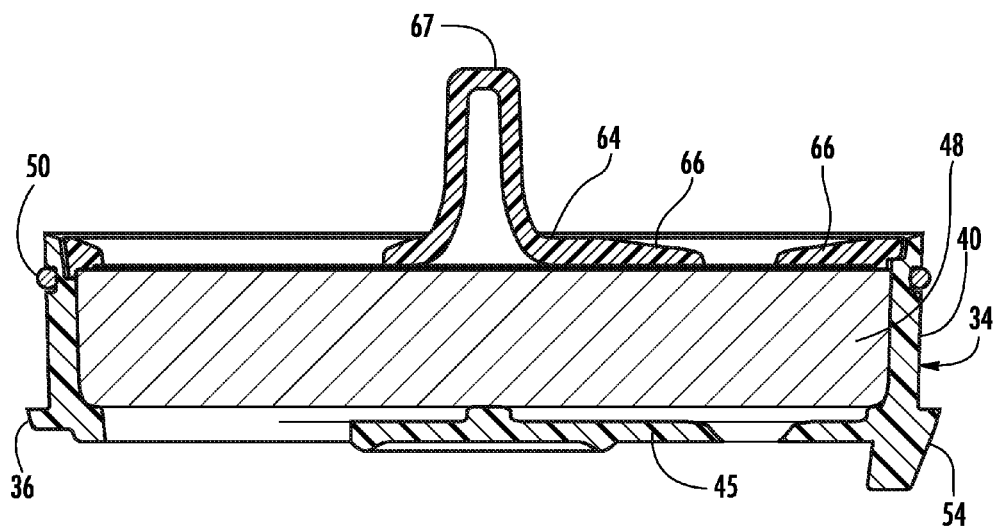
FIG. 20A is a cross-sectional view of the filter of FIG. 19A.
Figure 58:
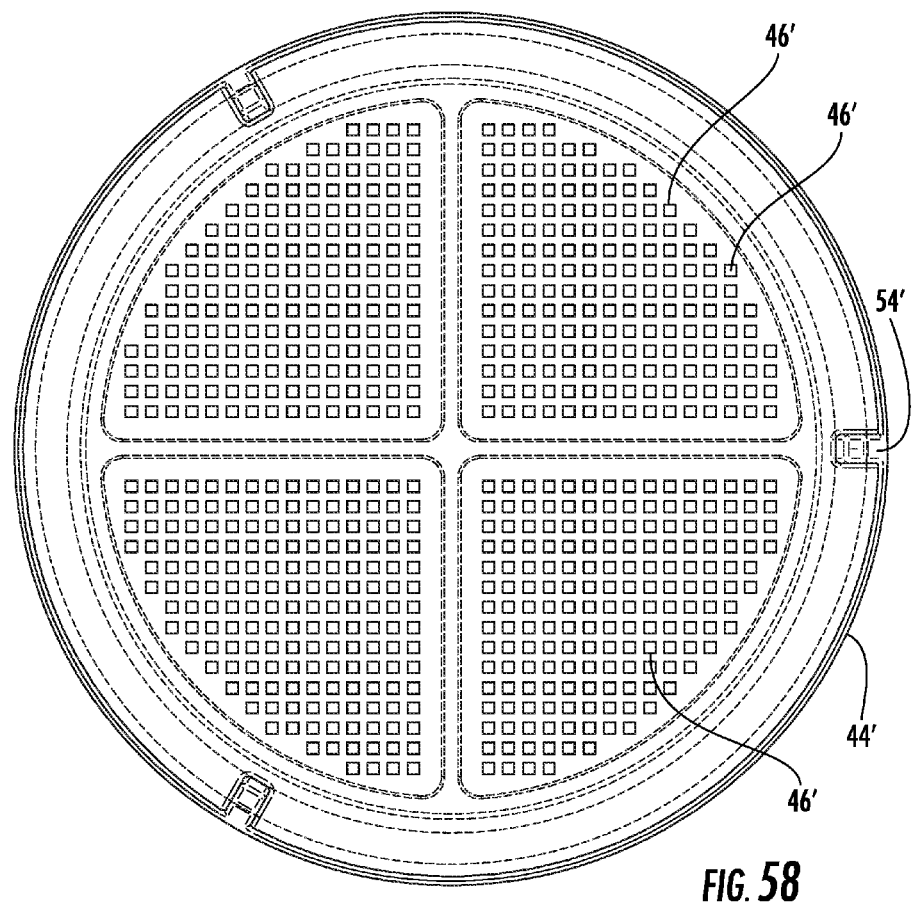
FIG. 58 is a bottom view of the filter shown in FIG. 54.

The filter further typically includes a filter base 44, which may be spoked (reference numeral 45) about a hub 47, FIG. 18, or have a sufficient number and/or sized apertures 46 (or 46' in FIGS. 58-60) to allow water flow at a rate faster than the water flow through the filter material 48, which may be a permeable or porous, loose or a more compressed filter media. The filter base 44 can be a separate component that is engaged with the side wall section 34 or the filter base may be integrated with the side wall section as a single component. An O-ring 50 or other typically elastomeric material is spaced within a channel 52 in the upper portion 40 or atop the upper portion 40 of the filter side wall 34. The bottom portion 38 of the filter side wall 34 also typically includes at least one, but more typically a plurality, and most typically about three downwardly projecting tabular members 54. These tabular members are matingly received within spaces 56 between the interior projecting members 58, which are typically wedge-shaped members or are human incisor teeth-shaped and project into the interior of the bottom funnel portion 12 per FIG. 7. The interior projection members have an upper shelf 59 that extends into the interior of the bottom funnel portion as well as tapered sides 61 extending down toward the liquid outlet 24 (see FIGS. 7 and 8). This somewhat lock-and-key-type engagement, where the tabular members 54 are seated at least partially, more typically fully, within the spaces 56, between the filter 16 and the funnel portion 12 facilitates the secure, but easy engagement and disengagement of the filter by hand and without the use of tools with the bottom portion 12 without being threadably engaged with one another. The engagement also facilitates the engagement of the filter with the bottom filter portion in such a manner that the appropriate indicator, when employed, shows through the cutout portion and that only purposeful adjustment of the filter within the funnel will change the indicator when viewed through the cutout portion 20. As mentioned above, different height versions of the filter 16 are possible. In particular, a tall version as described above with indicators 42 arranged on side wall surface 34 as shown in FIGS. 15 and 16 and a shortened version without side wall section 38 and indicators 42 arranged on side wall surface 34 as shown in FIGS. 15A, 16A, 19A, and 20A.

Figure 7:
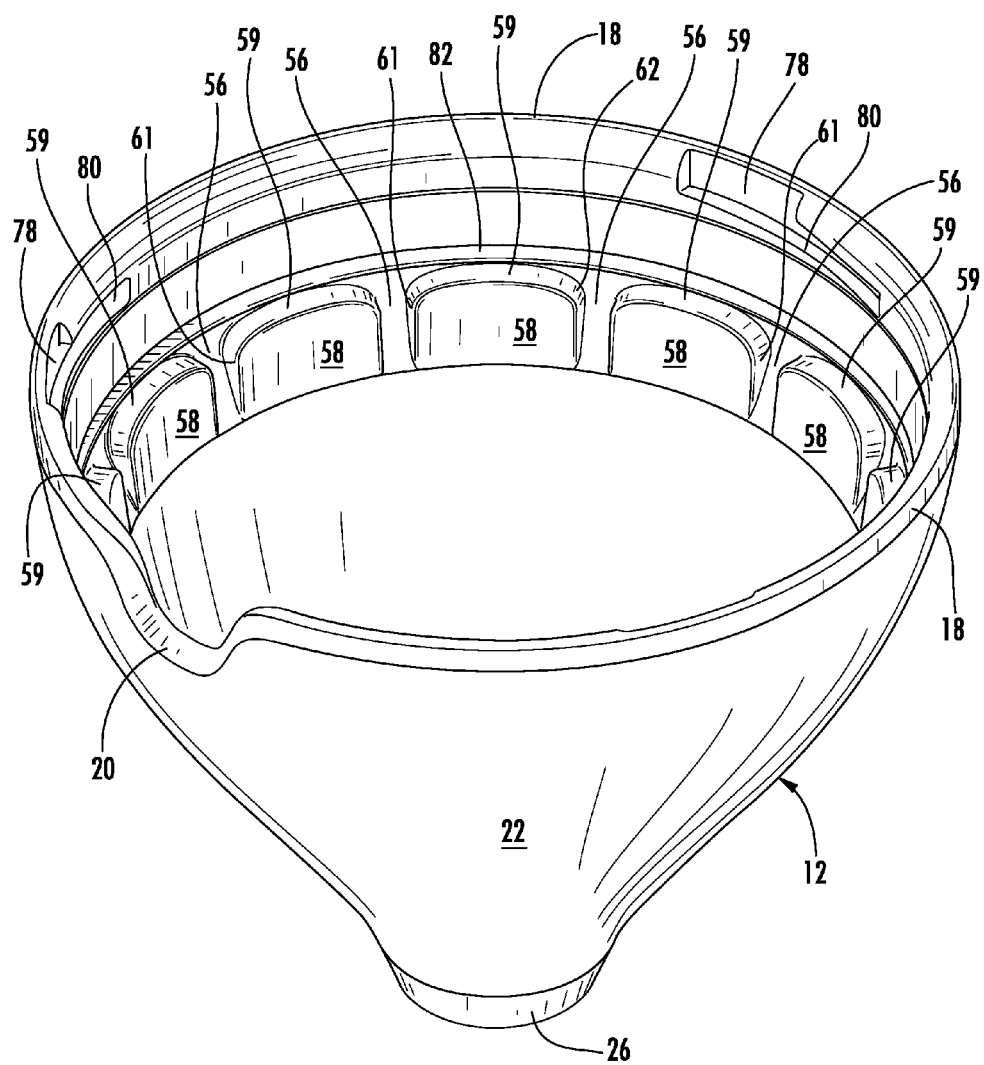
FIG. 7 is a front perspective view of the bottom funnel portion of a drop-shaped gravity filter assembly according to an aspect of the present disclosure.
Figure 8:
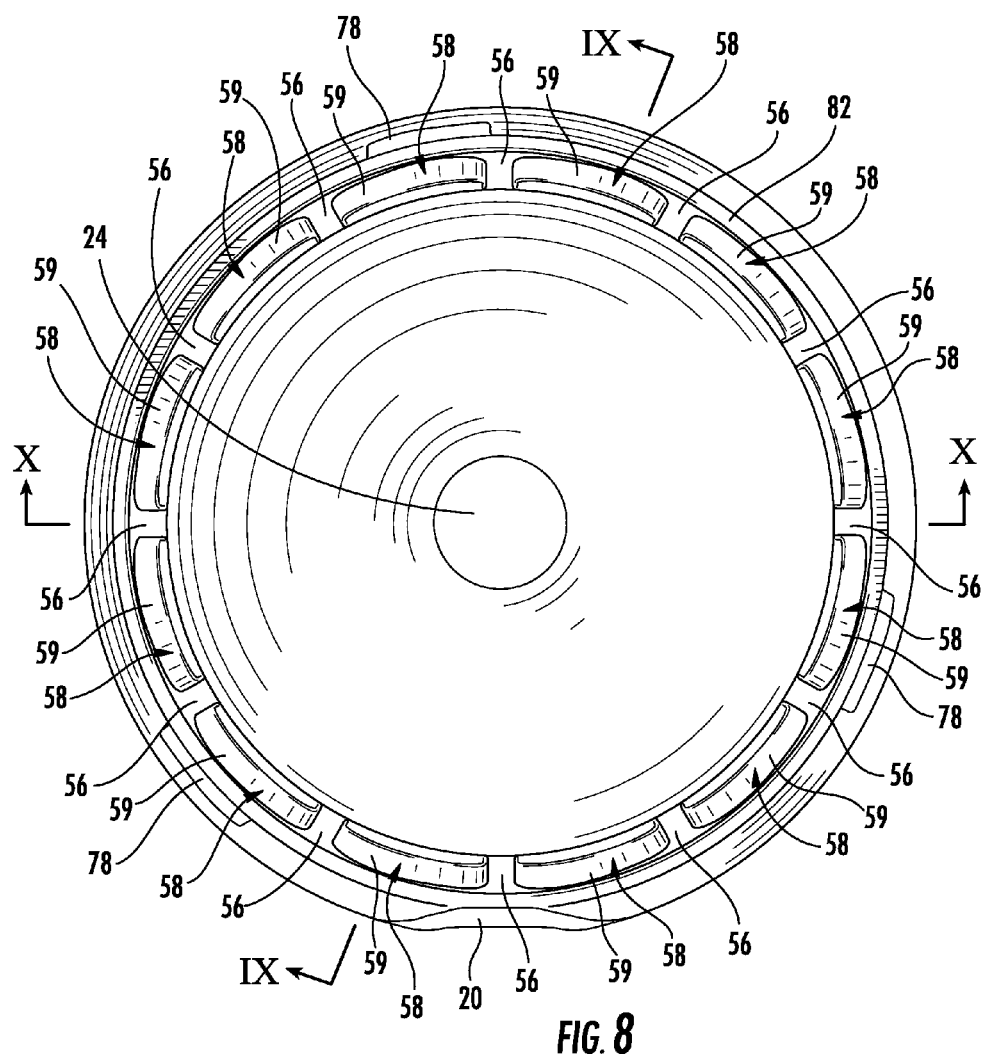
FIG. 8 is a top view of the bottom funnel portion according to an aspect of the present disclosure.

The filter also typically has a filter top 60 that seals the filter material 48 within the overall filter 16. The filter top 60 typically a circular perimeter and typically has a perforated structural section 62 as shown in FIGS. 5 and 7 that is typically sized and shaped to fit within the side wall section 34 and rim 68 of the top cap portion 14. The perforated structural section is joined (shown, using spokes 66) with a hub 64, which typically is centrally located and has an upwardly projecting spindle 67 to facilitate it being grasped by a user. The perforated structural section allows for fluid, typically water, to flow through apertures 49 in the filter top and into engagement with the filter material 48 to allow the water or other fluid to be treated by the filter material.

Figure 11:
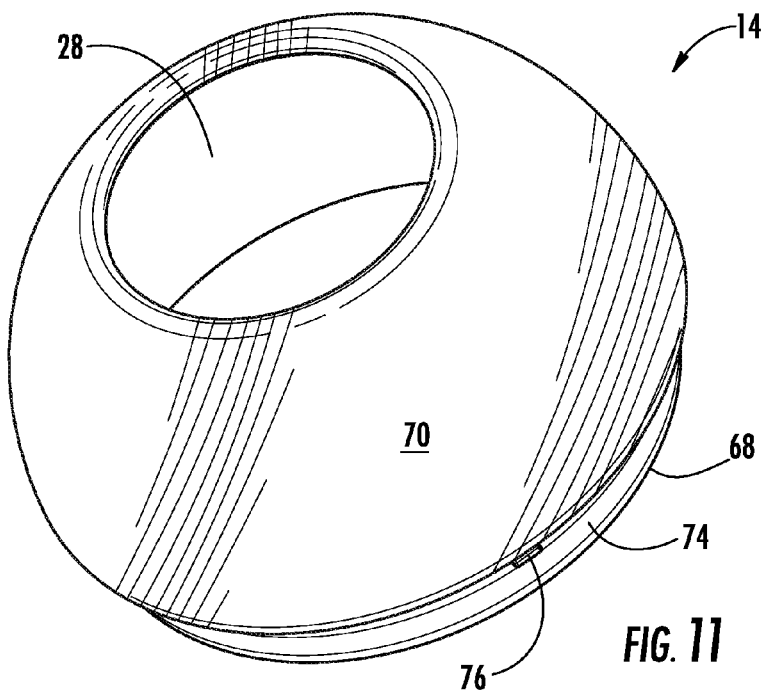
FIG. 11 is a perspective view of the top cap portion of a drop-shaped gravity filter assembly according to an aspect of the present disclosure.
Figure 12:
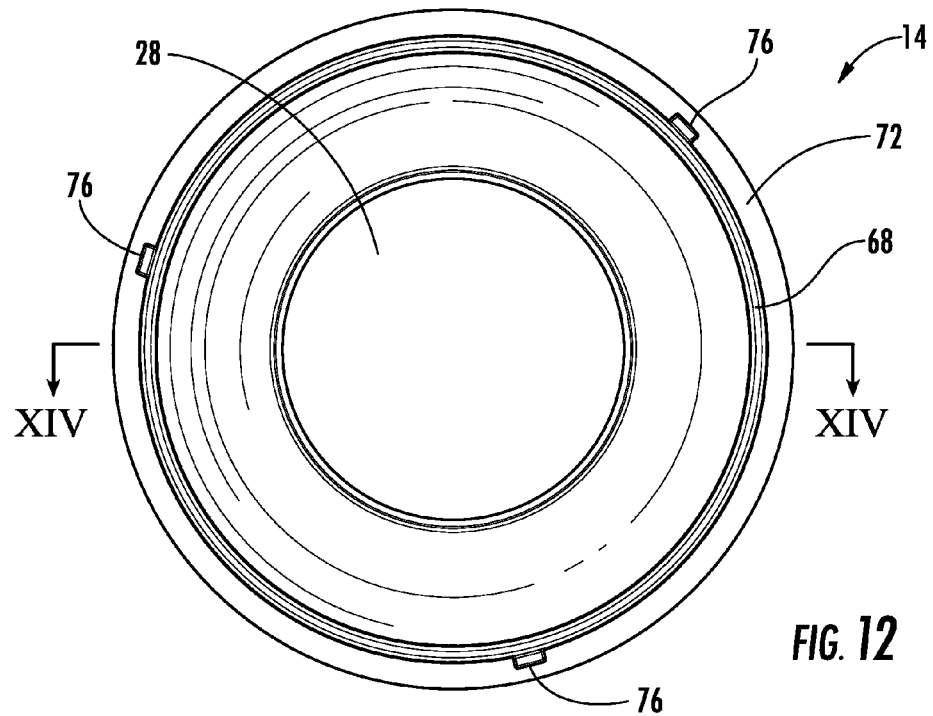
FIG. 12 is a bottom view of the top cap portion of a drop-shaped gravity filter assembly according to an aspect of the present disclosure.
Figure 13:
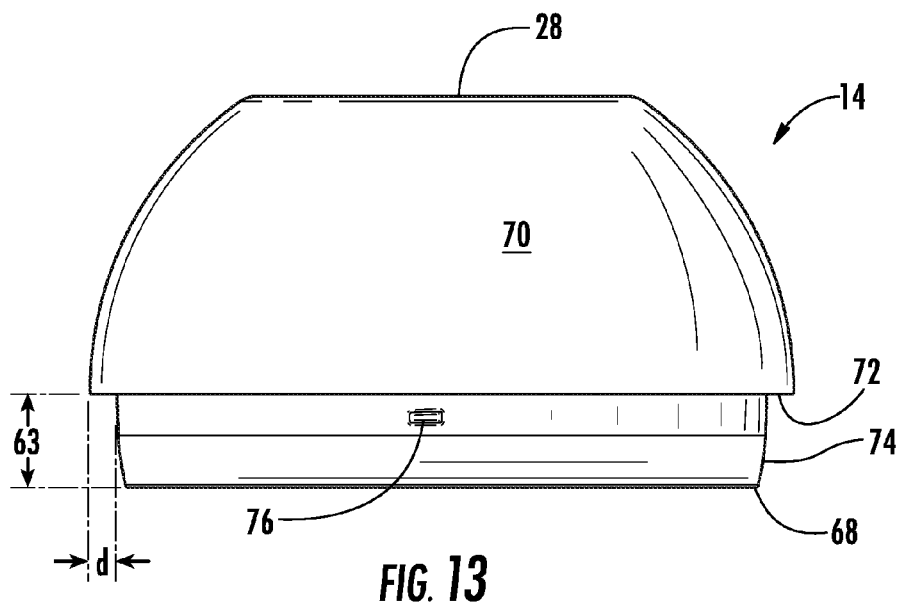
FIG. 13 is an elevated side view of the top cap portion according to an aspect of the present disclosure.
Figure 14:
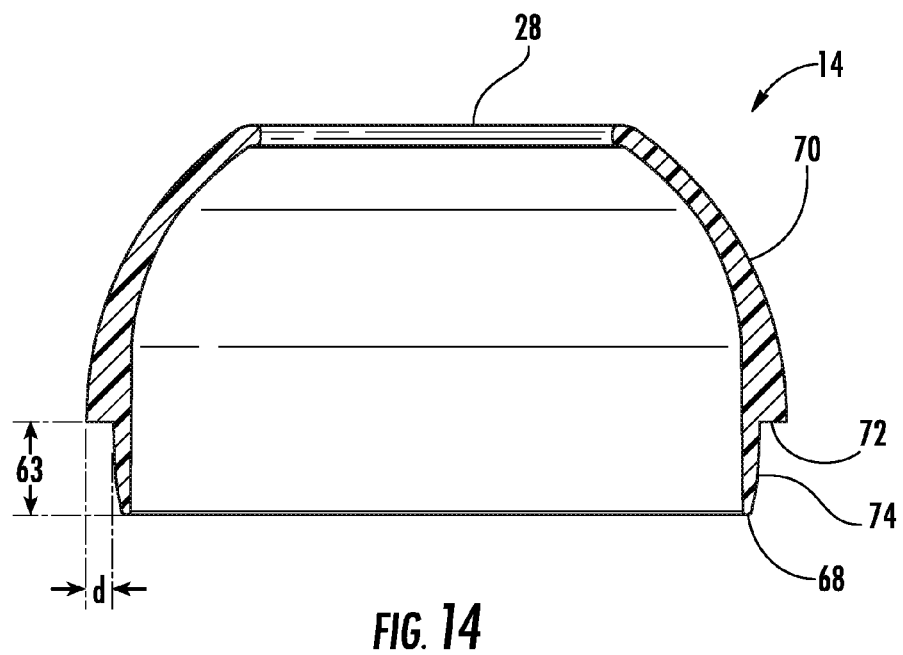
FIG. 14 is a cross-sectional view of the top cap taken along lines XIV-XIV in FIG. 12.

The perimeter rim section 63 of the top cap portion 14 is typically indented a specific distanced from the outer curved wall portion 70 such that the outer curved wall portion mates with the bottom funnel portion 12 outside surface 22 and creates an at least substantially contiguous surface such that the exterior of the gravity filter assembly appears to be a smooth surface when assembled. The indented distanced creates a lip 72 and having a depth "d". As shown in FIGS. 5, 5A, 11, 12, 13 and 14, the perimeter rim section 68 outer surface 74 typically includes at least one, more typically a plurality of, and most typically about three slanted elongated members 76 that extend away from the outer surface 74 and are received in gaps 78 in the interior surface of the bottom funnel portion such that when the top cap portion is engaged with the bottom funnel portion and rotated, the elongated members 76 slide into engagement with the grooves 80 to retain the two in engagement with one another, but still allowing the two pieces to be disengaged and reengaged with one another by hand and without the use of tools. Alternative versions of the engagement members are shown in FIGS. 11-13, which show the members 76 that are smaller, more rectangular prism shaped members that may or may not be slanted. They are shown not slanted.

The interior of the bottom portion 12 also typically has an interior shelf 82 (see FIG. 7) that receives the lip 36 of the side wall of the filter 16 and engages the bottom surface of that lip 36. The top surface of the lip 36 typically engages the funnel engaging rim 68.

The at least one medium 48 is typically a filter medium, but conceivably could add components to the fluid (typically water) flowing through, or otherwise, into contact with the at least one medium 48. As discussed later in more detail, this could include chlorine or other halogens. Typically, the at least one medium is a filter medium 48. The medium is positioned within the filter 16 and may include: (1) material configured to treat water, especially water for human consumption, chosen from a treatment group consisting of filtering particulate matter from the water; (2) material that adds a descaling agent to the water, vitamins to the water, minerals to the water, and/or one or more pharmaceutically active agent(s); (3) material that removes specific soluble organic or in-organic elemental compounds and thus improves the taste of the water, removes odor from the water, and alters the color of the water; (4) reduces concentrations of heavy metals, pesticides, volatile organic compounds, specific pharmaceutically active agents; (5) removes cysts and micro-organisms; (6) adding a halogen such as bromine, iodine, chlorine compounds as a disinfectant agent to the water; (7) conditions the water such as softening through use of ion exchange resins or ALUSIL™ (an aluminosilicate) to change the chemical structure of calcium chloride in solution to reduce scaling deposition; or (8) combinations of any or all of the above materials.

The descaling agents that may be added to the fluid by the treatment medium may be chosen from the group consisting of organic acid, inorganic acid, sulfonic acid, carboxylic acid, lactic acid, acetic acid, formic acid, oxalic acid, uric acid, phosphoric acid, hydrochloric acid, sulfamic acid, and mixtures thereof. The water treatment medium contained in the filter may also be chosen from the group consisting of: carbon (e.g., activated carbon particles, such as mesoporous activated carbon, carbon powder, particles sintered with a plastic binder, carbon particles coated with a silver containing material, or a block of porous carbon); ion exchange material (e.g., resin beads, flat filtration membranes, fibrous filtration structures, etc.); zeolite particles or coatings (e.g., silver loaded); polyethylene; charged-modified, melt-blown, or microfiber glass webs; alumina; aluminosilicate material; and diatomaceous earth. The water treatment medium may also be impregnated or otherwise disposed on a porous support substrate, such as a fabric material, a paper material, a polymer screen, or other conceivable porous structures that may be contained in the filter.

The water treatment medium 48 typically allows a water flow rate of at least approximately one to two liters per minute. The medium typically also reduces chlorine, taste and odor components (CTO) per NSF 42 to minimum of 60 gallons and Atrazine, Benzene, Alachlor and Lindane per NSF 53 for minimum of 60 gallons. The filter medium 48 also typically removes lead, copper, mercury, cadmium and arsenic (pH 6.5 per NSF 53 2004 standard) for up to 60 gallons, sfd. Media from Selecto described in U.S. Pat. Nos. 6,241,893 and 6,764,601, the disclosures of which are hereby incorporated by reference in their entirety, may be used. The filter medium does not typically require any presoaking and does not typically contain any carbon fines, in particular carbon fines that might find their way to the treated water, which often occurs when current carbon based gravity filters are used.

Figure 21:
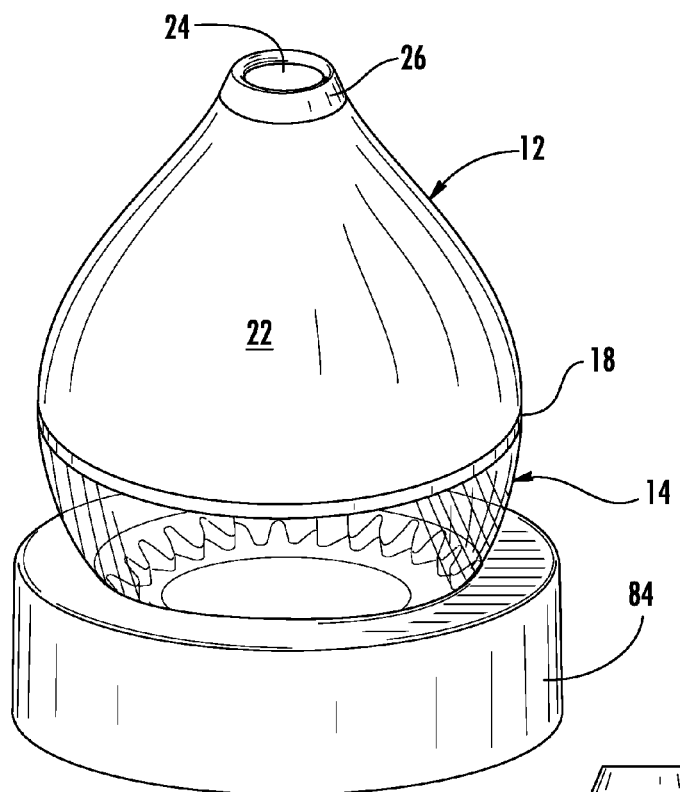
FIG. 21 is a perspective view of the drop-shaped gravity filter assembly according to an aspect of the present disclosure seated in a stand.
Figure 22:
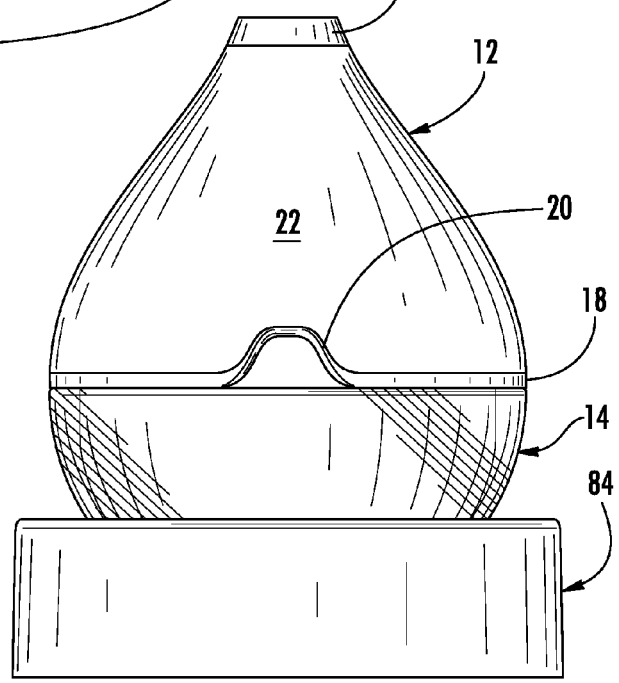
FIG. 22 is an elevated front view of the drop-shaped gravity filter assembly according to an aspect of the present disclosure seated in a stand.
Figure 47:
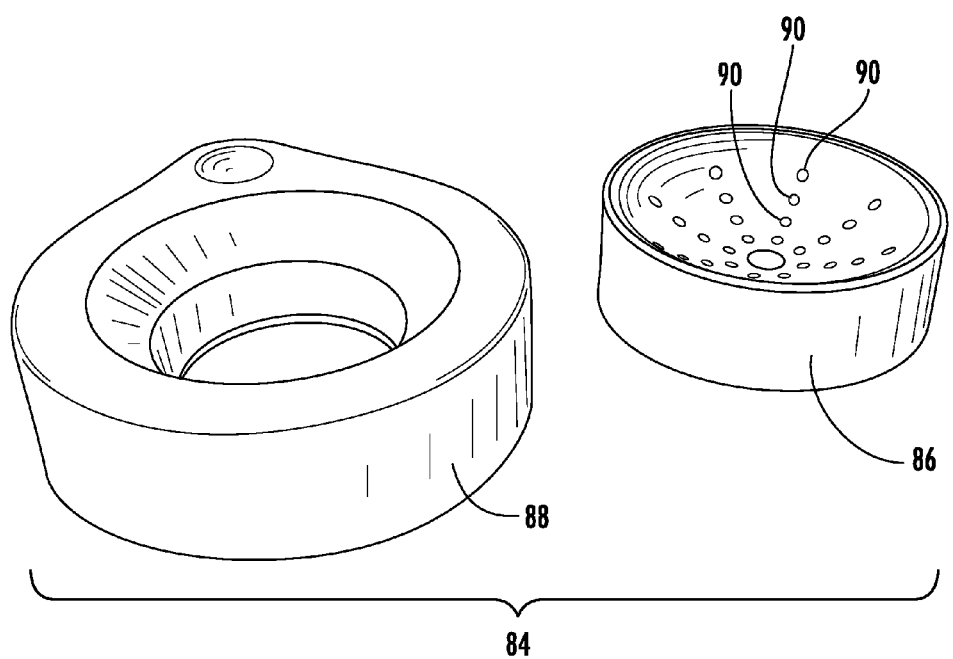
FIG. 47 is an alternative base holder for the drop-shaped gravity filters according to various aspects of the present disclosure.
Figure 48:
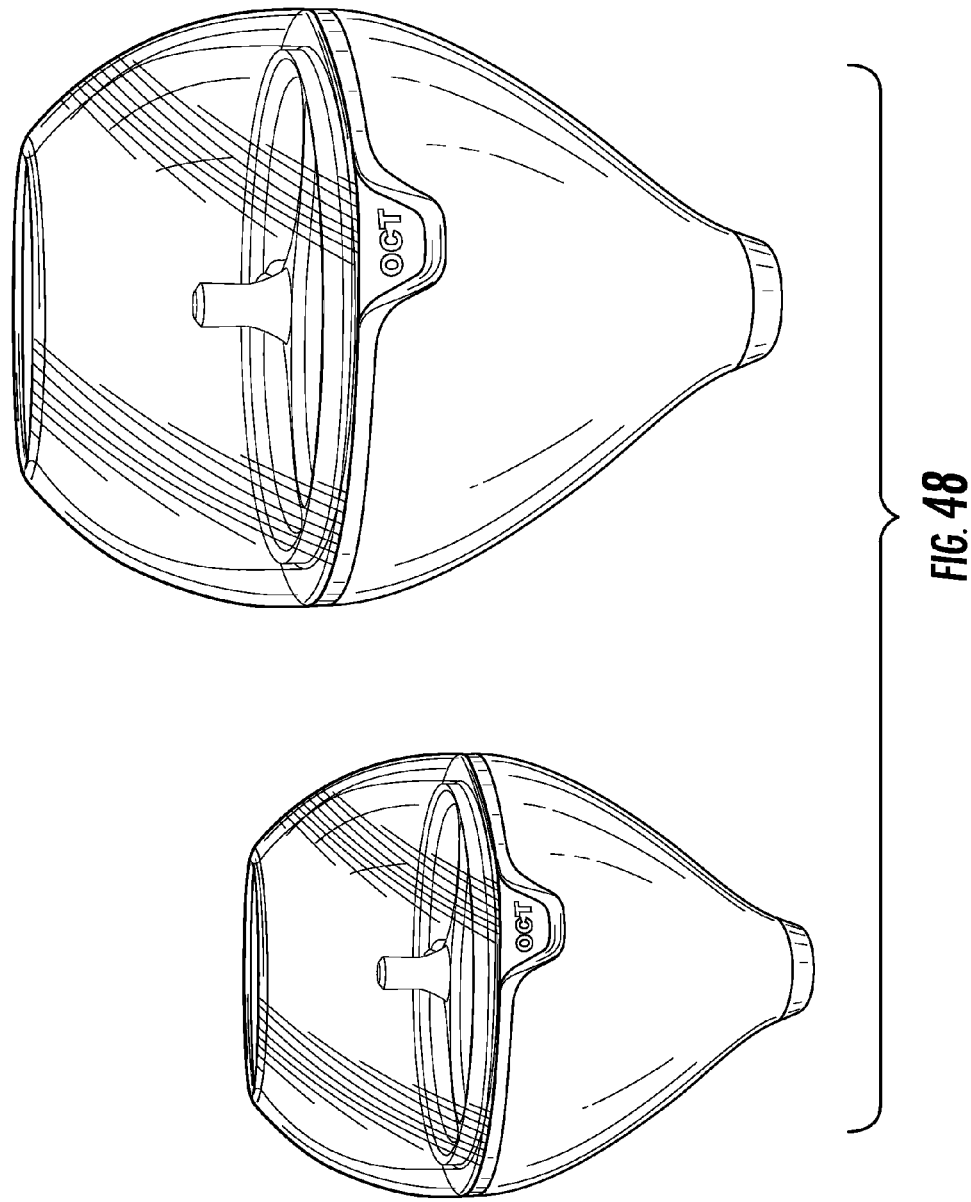
FIG. 48 is a perspective view showing alternatively sized drop-shaped gravity filters according to the present disclosure that are sized to fit variously sized vessel openings.

As shown in FIGS. 21-22 and 48, the gravity filter assembly 10, especially when it is a drop-shape, can be seated in a stand 84 that is substantially circular or having the same shape as the top cap portion 14. The drop-shaped gravity filter assembly is positioned in an inverted manner in the stand and seated within the center section of the stand. As shown in FIG. 47, the center of the stand insert 86 may be removable and detachable from the perimeter stand portion 88. The center of the stand insert 86 may be metal with apertures 90 configured to allow water flow into the interior of the insert 86 away from the gravity filter assembly 10. The center section of the stand, which includes the center of the stand insert, but may also include a portion of the perimeter stand portion 88 as well, is typically a concave surface that matingly engages the inverted top cap portion 14. The center of the stand insert may also optionally be integrated into the overall stand and may be an elastomeric material that is flexible, but returns at least substantially to its original form when the gravity filter assembly is removed from the stand 84.

Figures 23, 24:
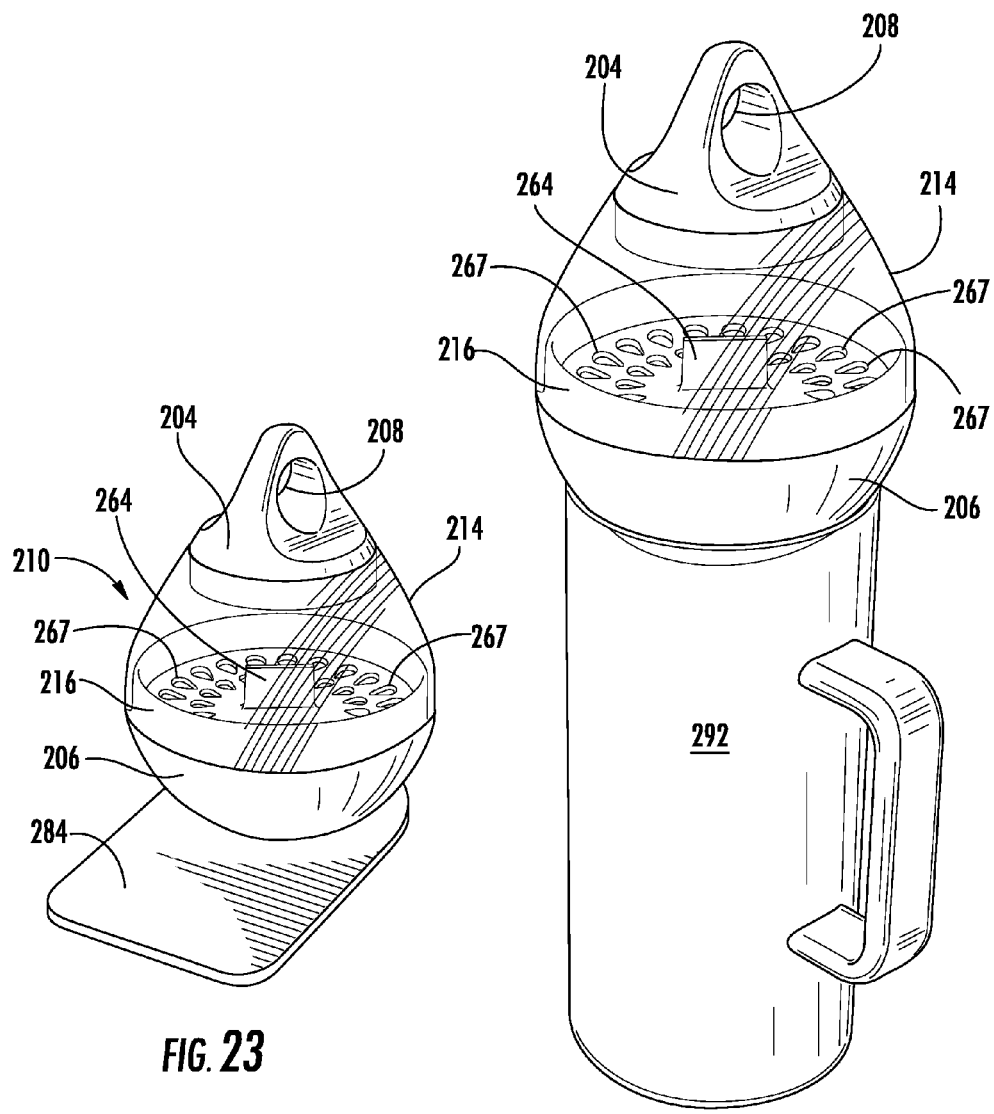
FIG. 23 is a perspective view of a drop-shaped gravity filter assembly according to another aspect of the present disclosure seated within a stand.
FIG. 24 is a perspective view of a drop-shaped gravity filter assembly of the present disclosure seated within a vessel such as a beverage container or pitcher.
Figure 28:
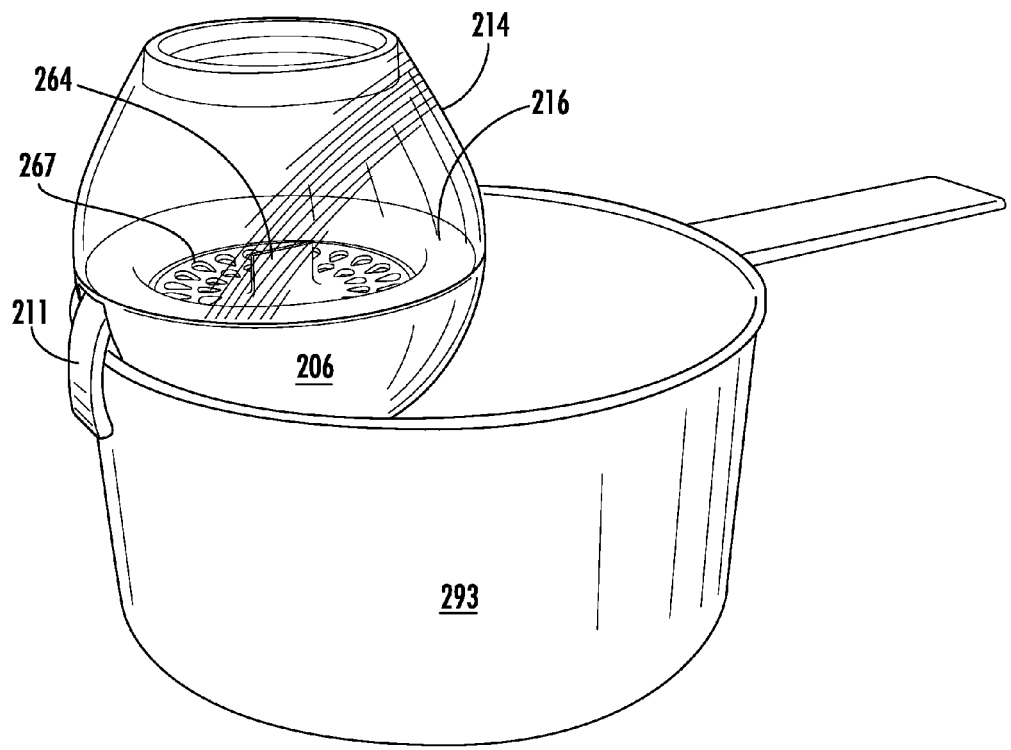
FIG. 28 is a perspective view of a drop-shaped gravity filter assembly according to an aspect of the present disclosure with a pot or beverage rim engagement mechanism within the bottom portion of the drop-shaped gravity filter assembly in the engaged position on the rim of a pot.
Figure 44:
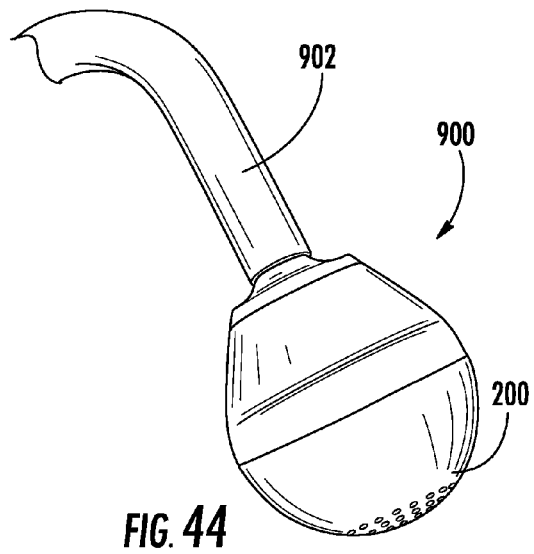
FIG. 44 is a side view of another aspect of the drop-shaped gravity filter assembly operably (threadably) engaged to a faucet.

An alternative version of a gravity filter assembly of the present disclosure is shown in FIGS. 23-29. The drop-shaped gravity filter assembly 210 includes a bulbous bottom portion with at least one treated fluid (water) outlet aperture, but preferably a plurality of treated fluid outlet apertures 200, as shown in FIG. 44, which results in a discharge pattern resembling rainfall. The drop-shaped gravity filter assembly 210 typically also may employ an inlet plug 204 that may be threadably or otherwise engaged and disengaged with the top cap portion 214 in such a manner as to seal the inlet and allow the filter to be engage via a hook, clasp, or other attachment device 209 to a backpack or other carrying device via at least one aperture 208. The filter as shown in this version includes a plurality of apertures 267 instead of spokes and an upstanding wall 216 within the top cap. Either may be used as a pathway for water to enter into the filter in any of various versions. The filter also has an alternative hub 264, which is a flat planar upwardly extending member instead of a more spindle type construction. As with other versions of the drop-shaped filter, the bulbous design or the funnel shaped bottom portion engages a plurality of vessels with differently sized openings in their top such as differently sized pitchers 292. Also, as shown in FIG. 23, the bulbous drop-shaped water filter may engage a flat planar stand 284 having an aperture or indentation sized to receive the drop-shaped filter, which keeps it from rolling or moving on a flat countertop or other surface the filter is placed upon.

Figure 29:
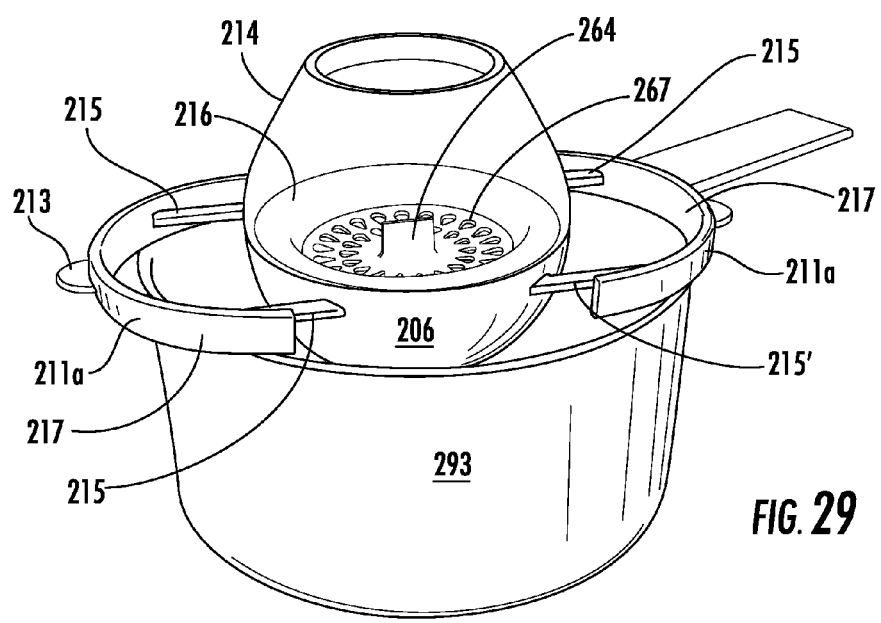
FIG. 29 is a perspective view of another aspect of the drop-shaped gravity filter assembly where the filter is suspended using at least two laterally moveable pot suspension engagement ring portions that extend between a retracted and extended position.

The bulbous portion may have a vessel suspension device 211 that is moveable between an open vessel engaging position as shown in FIG. 27 and a retracted closed position as shown in FIG. 26 that positions the vessel suspension device 211 such that the perimeter conforms at least substantially with a exterior shape of the of the bulbous (bottom) portion 206. The vessel suspension device may also take an alternative form shown in FIG. 29. The vessel suspension device 211a can include two curved sections 217 that may be pulled away from the bulbous portion 206 between an active/open position as shown in FIG. 29 that holds the filter in a substantially central position over the opening of the vessel, which is a cooking pot 293 in the case of FIG. 29. The operator grasps the finger tabs 213 on each side and provides a lateral force that pulls the system from the closed position engaged to the bulbous section of the filter and joined by support bridging members 215 and 215'.

Figure 30:
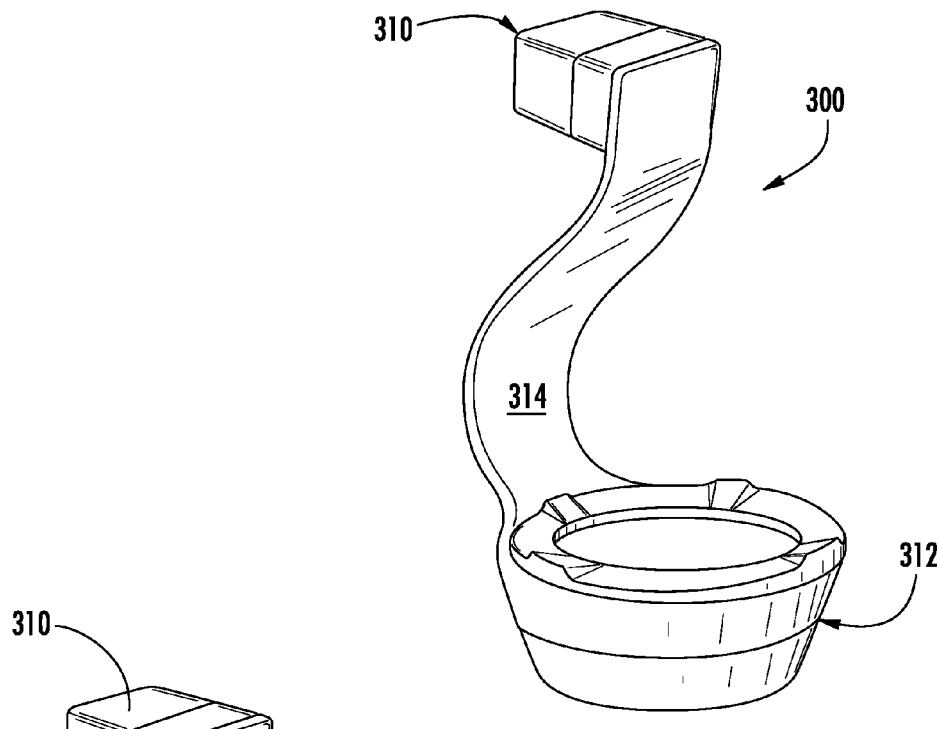
FIG. 30 is a perspective view of a carrying handle that receives a drop-shaped gravity filter assembly according to an embodiment of the present disclosure.
Figure 31:
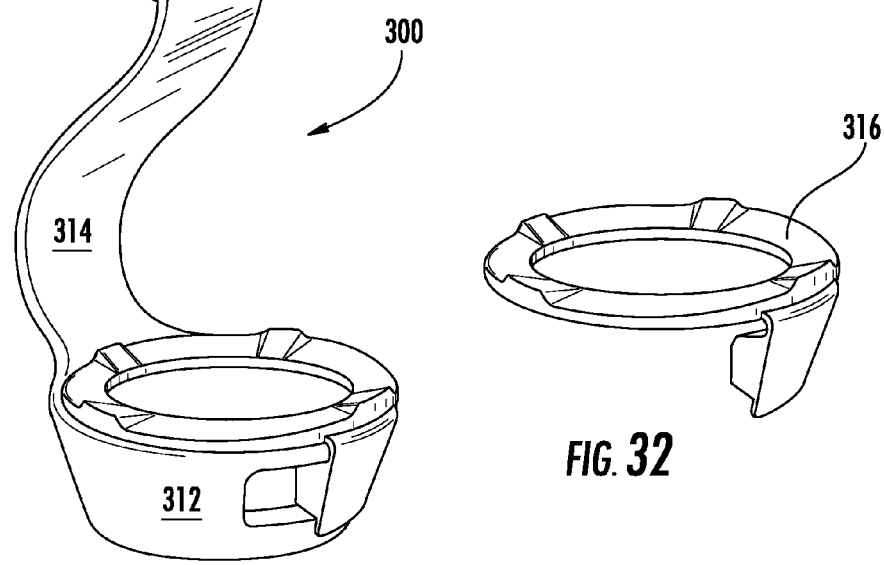
FIG. 31 is a perspective view of a carrying handle according to another aspect of the present disclosure.
Figure 32:
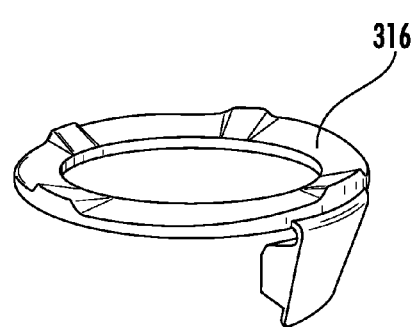
FIG. 32 is a perspective view of a locking member that engages with the handle shown in FIG. 31 to securely retain the drop filter when inserted into the handle carrying device shown in FIG. 31.
Figures 33, 34:
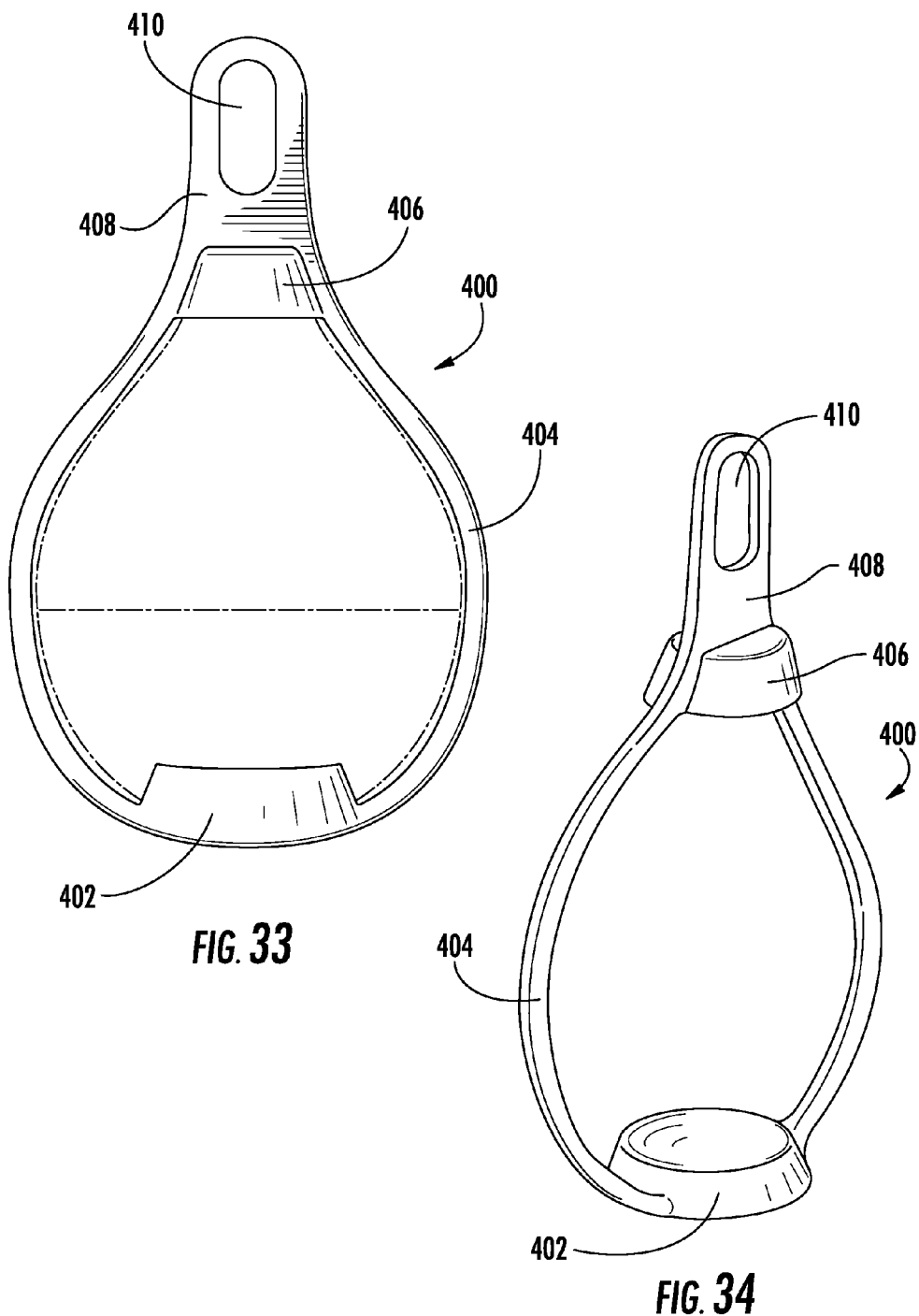
FIG. 33 is an elevated side view of an elastomeric carrying device.
FIG. 34 is a perspective view of an elastomeric carrying device of FIG. 33.
Figure 35:
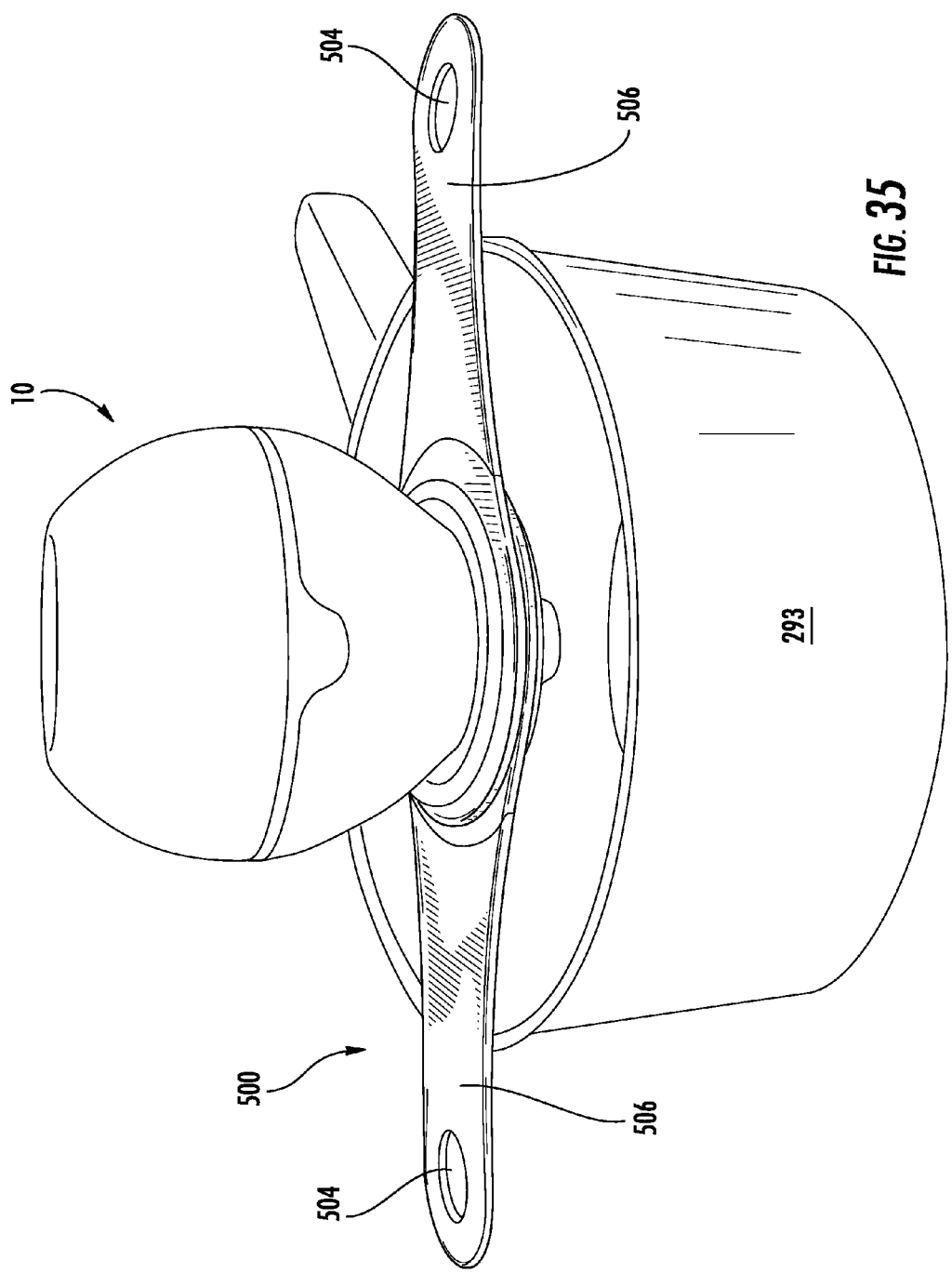
FIG. 35 is a perspective view showing an embodiment of the drop-shaped gravity filter assembly of the present disclosure suspended by a filter suspension device.
Figure 36:
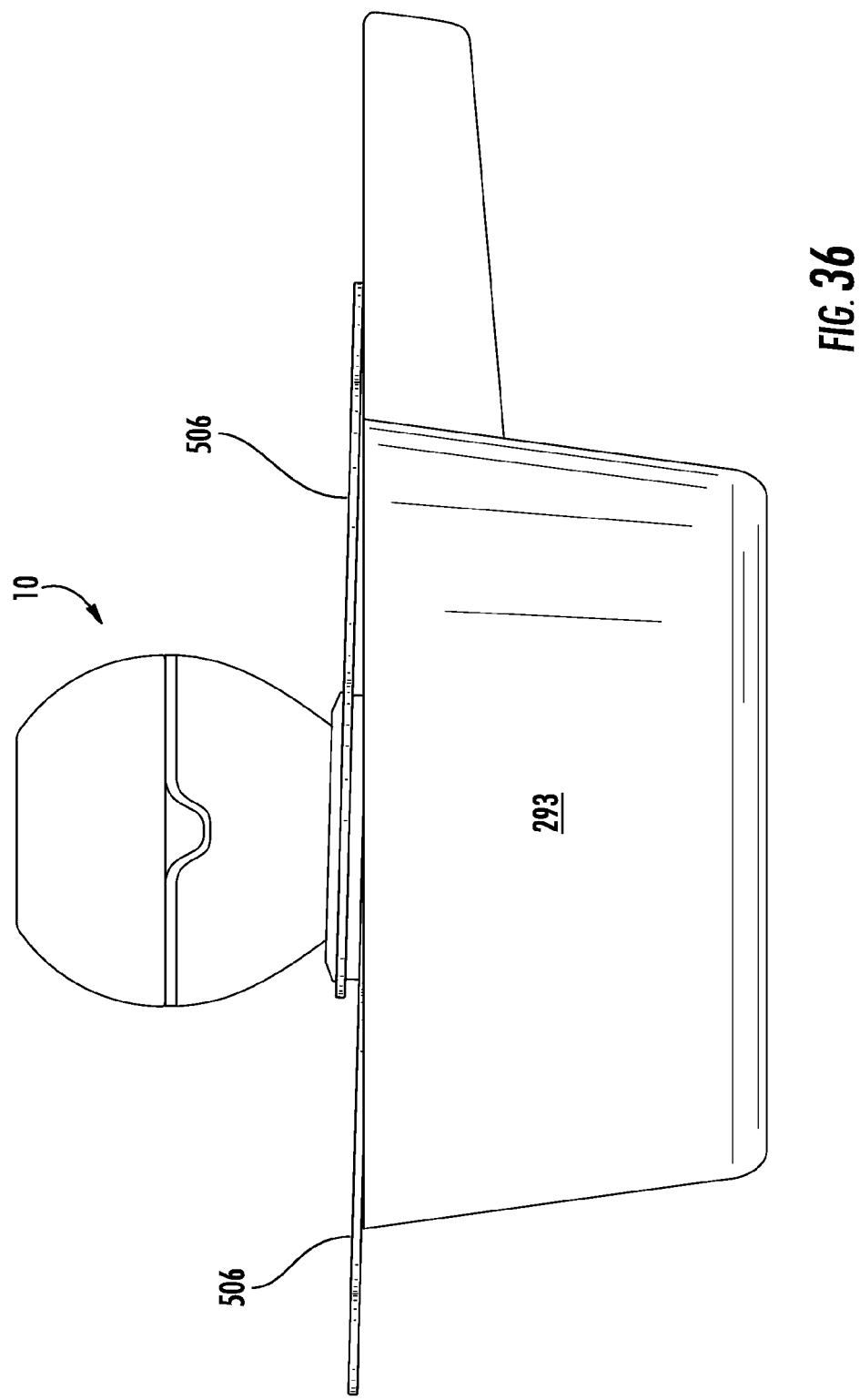
FIG. 36 is an elevated side view of a drop-shaped gravity filter assembly according to an aspect of the present disclosure with a pot or beverage rim engagement mechanism within the bottom portion of the drop-shaped gravity filter assembly in the open position.
Figure 37:
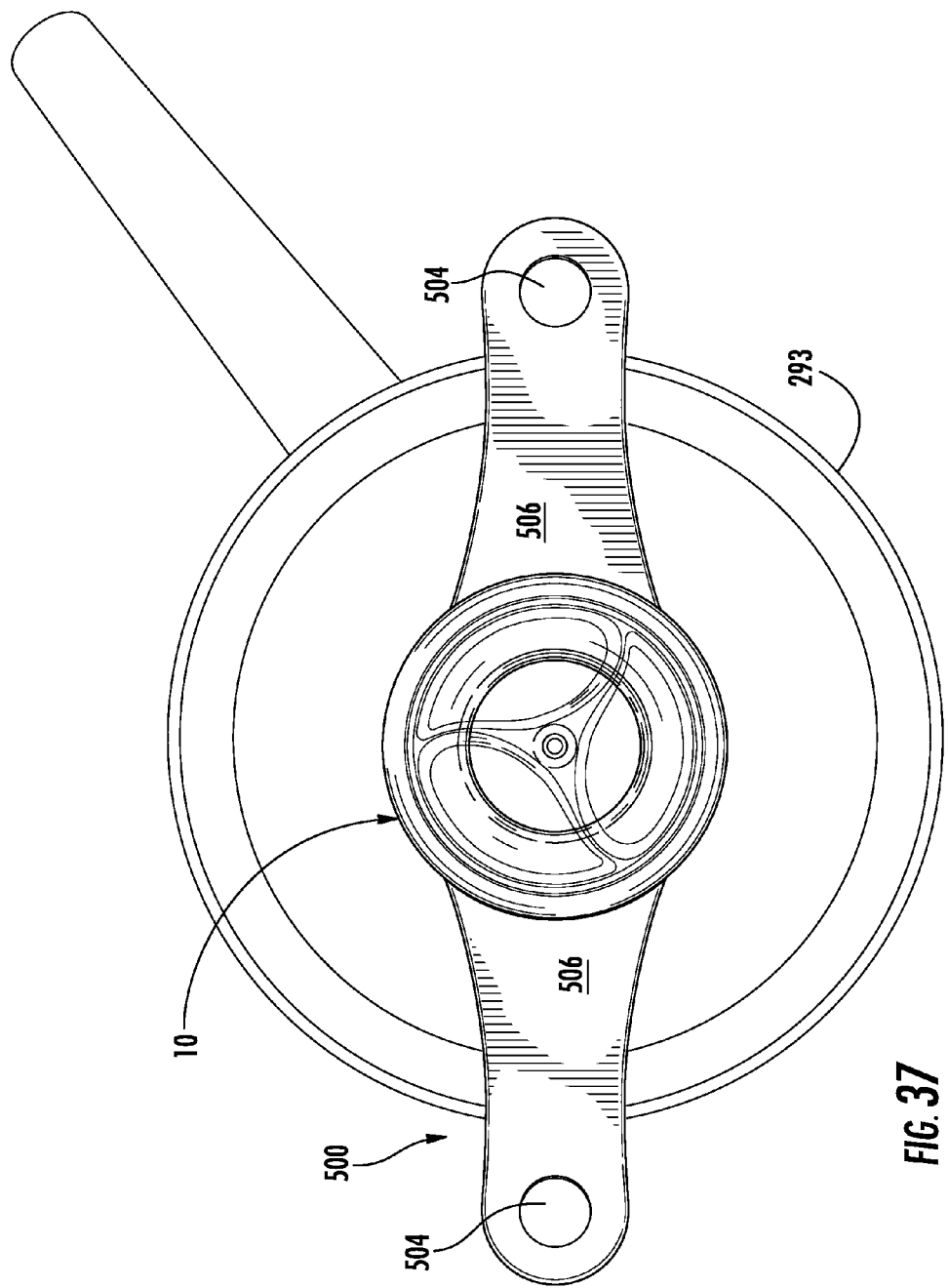
FIG. 37 is a top view of a drop-shaped gravity filter assembly according to an aspect of the present disclosure with a pot or beverage rim engagement mechanism within the bottom portion of the drop-shaped gravity filter assembly in the open position.

FIGS. 30-32 depict aspects of a filter carrying device 300 that engages the filter and allows a user to carry the filter using the handle 310. The filter is inserted into the base 312. The base 312 is linked to the handle by a suspension member 314 that is configured and shaped to fit snuggly along the periphery of the gravity filter assembly when the filter is inserted within the base. The carrying device 300 may also include a locking member 316 that functions to retain the filter within the base. Typically the locking member 316 retains the filter within the carrying device using frictional force.

FIGS. 33-39 show another filter carrying device 400. The carrying device 400 is typically constructed of an elastomeric material on exterior surface 404, a base 402 that seals the inlet of the filter and a top cap 406 that seals the outlet of the filter. The top cap 406 typically has an upwardly extending section 408 with a carrying aperture 410 for engagement with a hook, clasp or other attachment device or member as similarly shown in FIG. 25. The carrying device 400 provides an anaerobic seal that prevents microorganisms or other materials from entering the filter and contaminating the interior of the filter positioned within the carrying device 400.

Figure 52:
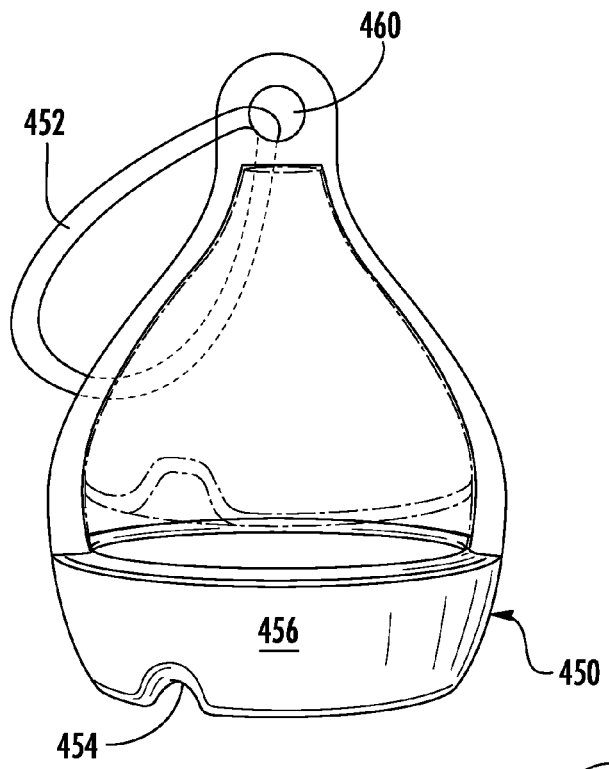
FIG. 52 is a perspective view of a carrying device according to an aspect of the present disclosure in the unengaged position.
Figure 53:
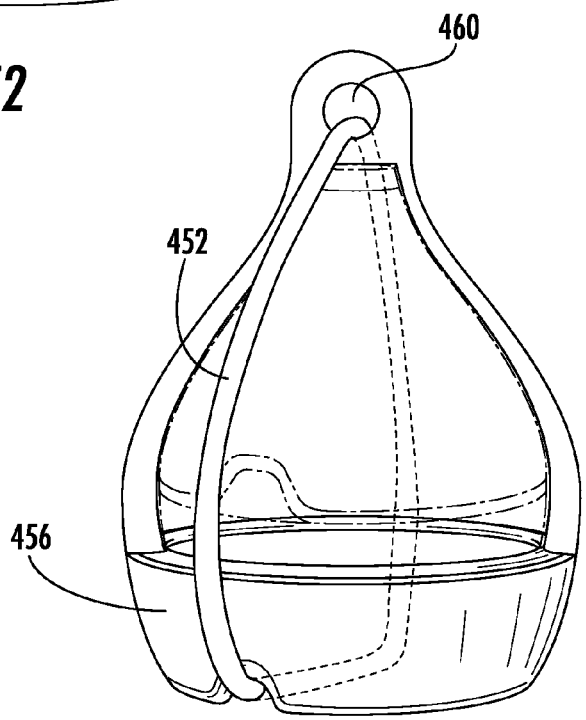
FIG. 53 is a perspective view of a carrying device according to an aspect of the present disclosure in the engaged position.

FIGS. 52-53 show yet another carrying device 450. This carrying device receives the drop-shaped gravity filter assembly 10 within it. An elastomeric retention band 452 that extends through the top aperture 460 and, when pulled taut and positioned within the channel 454 on the base of the carrying device 456, securely holds the filter 10 within the carrying device 456 using the force applied by the elastomeric band 452.

FIGS. 35-39A show an alternative filter suspension system 500 that is configured to work with various gravity filters of the present disclosure. In particular, the suspension system 500 is typically used in connection with the gravity filter assembly 10. The suspension system 500 rotates between a closed position (FIG. 39A) and an open position (FIGS. 35-39A) about the center aperture 502. As shown in FIGS. 35-39A, the filter is inserted into the center filter receiving aperture 502 of the suspension system 500. In the open position the suspension system 500 extends across the vessel, in the Figures, a pot 293. This allows a user to filter or treat water through the filter 10 and allow for treated/filtered water to enter into the vessel. As with other embodiments, the vessel and filter within the suspension mechanism can be transported to an unfiltered water source, such as tap water. Conceivably, but not typically, the unfiltered water source could be river water, lake water or some other naturally occurring water source like rain water, but the filter material should be such that the resultant filtered water is safe for human consumption. Unfiltered water is delivered to the filter and filtered/treated water delivered into the vessel. The suspension system in the open position has at least two perimeter apertures 504 at the end of the at least two laterally extending planar members 506 that extend away from the central filter receiving aperture 502. Conceivably, three or more substantially identical or identical laterally extending planar members 506 may be employed; however, two are more typically employed. When in the closed position the distal, perimeter apertures 504 are generally substantially aligned to allow for easy transport by a user grasping the system 500 by either the apertures 504 or the center filter receiving aperture 502.

Figure 40:
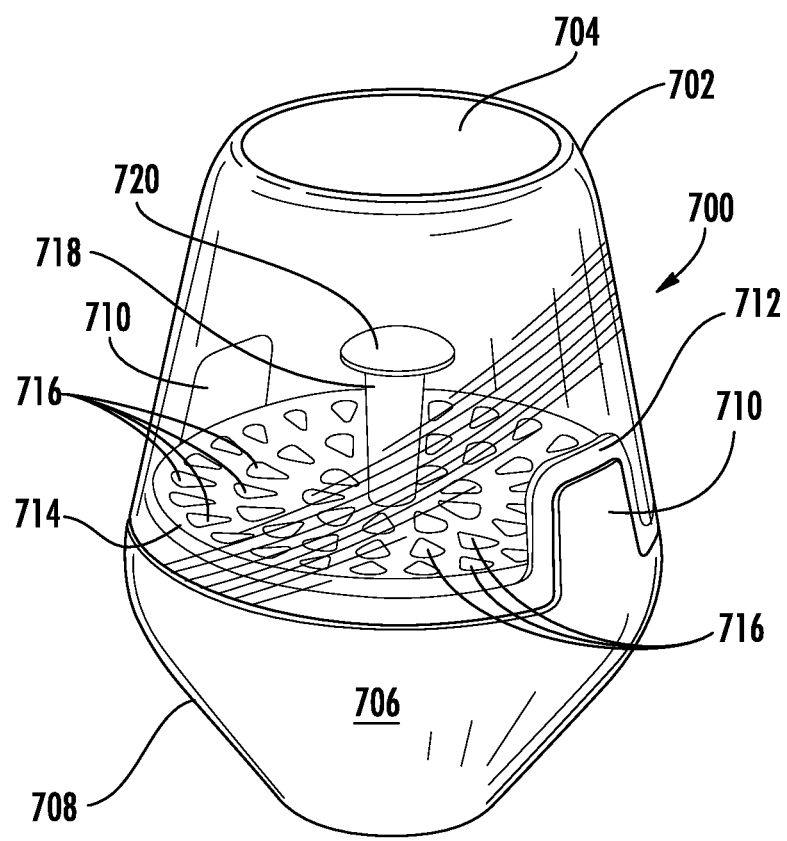
FIG. 40 is a perspective view of a gravity filter assembly according to another aspect of the present disclosure.
Figure 41:
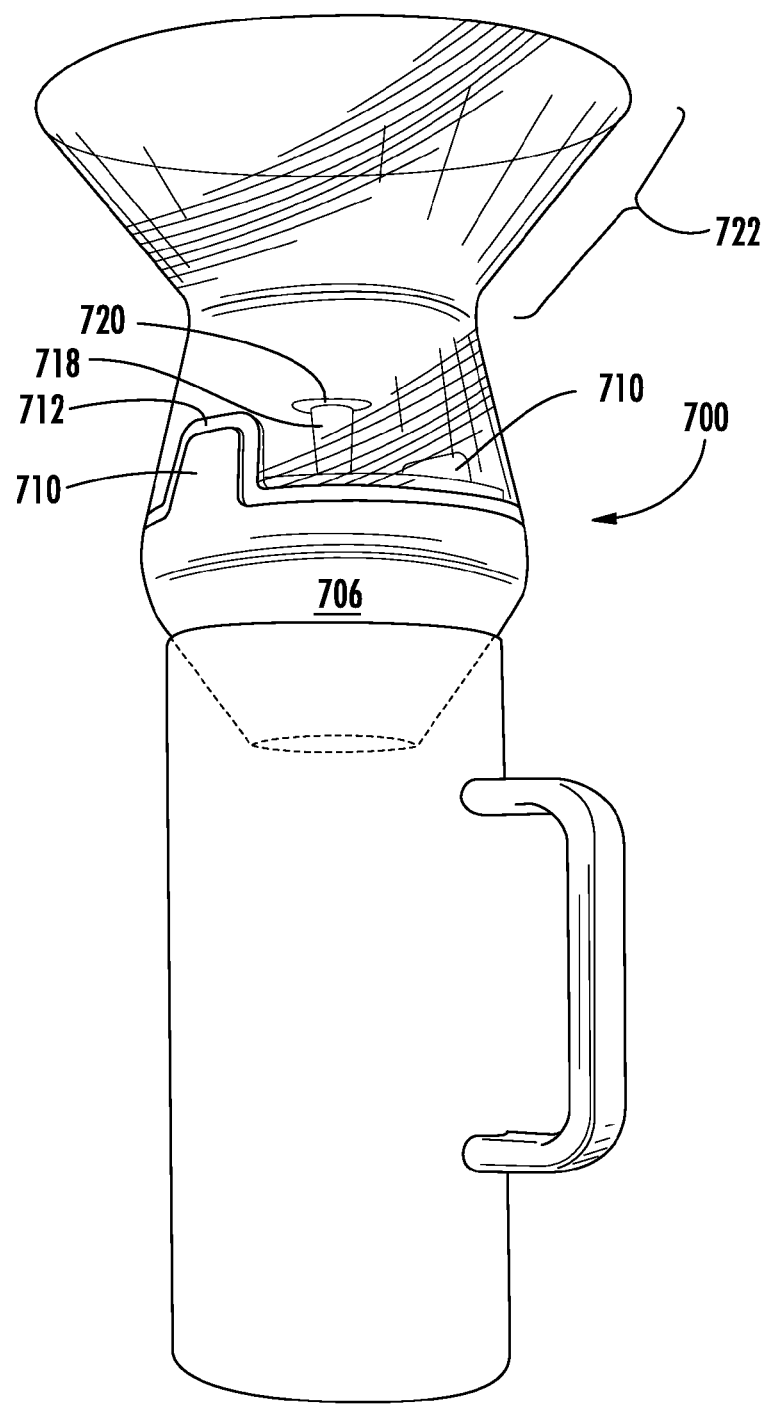
FIG. 41 is a perspective view of a shaped gravity filter assembly positioned on a liquid retaining vessel and having a conical top.

FIGS. 40-41 show additional aspects of the present disclosure. The filter shown in FIG. 40 is a filter 700 with a more cup-shaped top portion 722 with a water inlet aperture 704 and may include an upwardly extending portion 722, as shown in FIG. 41. The bottom portion 706 is substantially conical shaped with angled side section 708. The upper tabs 710 engage mating cutouts 712 of the top portion 702. The filter 714 has apertures 716 and an upwardly extending post 718 with a head 720 for the user to grasp to engage and disengage the filter according to this embodiment of the present disclosure.

FIG. 41 shows another aspect of the present disclosure similar to the filter shown in FIG. 40, but showing and interchangeable top portion due the common tab feature 710 with an upwardly opening funnel portion that feeds the water inlet aperture. FIG. 41 also demonstrates how the filter with the universal filter within it may function to fill vessels of any size with treated and/or filtered water or other fluids. FIG. 41 shows the filter 700 frictionally engaged along the bottom conical surface of the filter.

Figure 42:
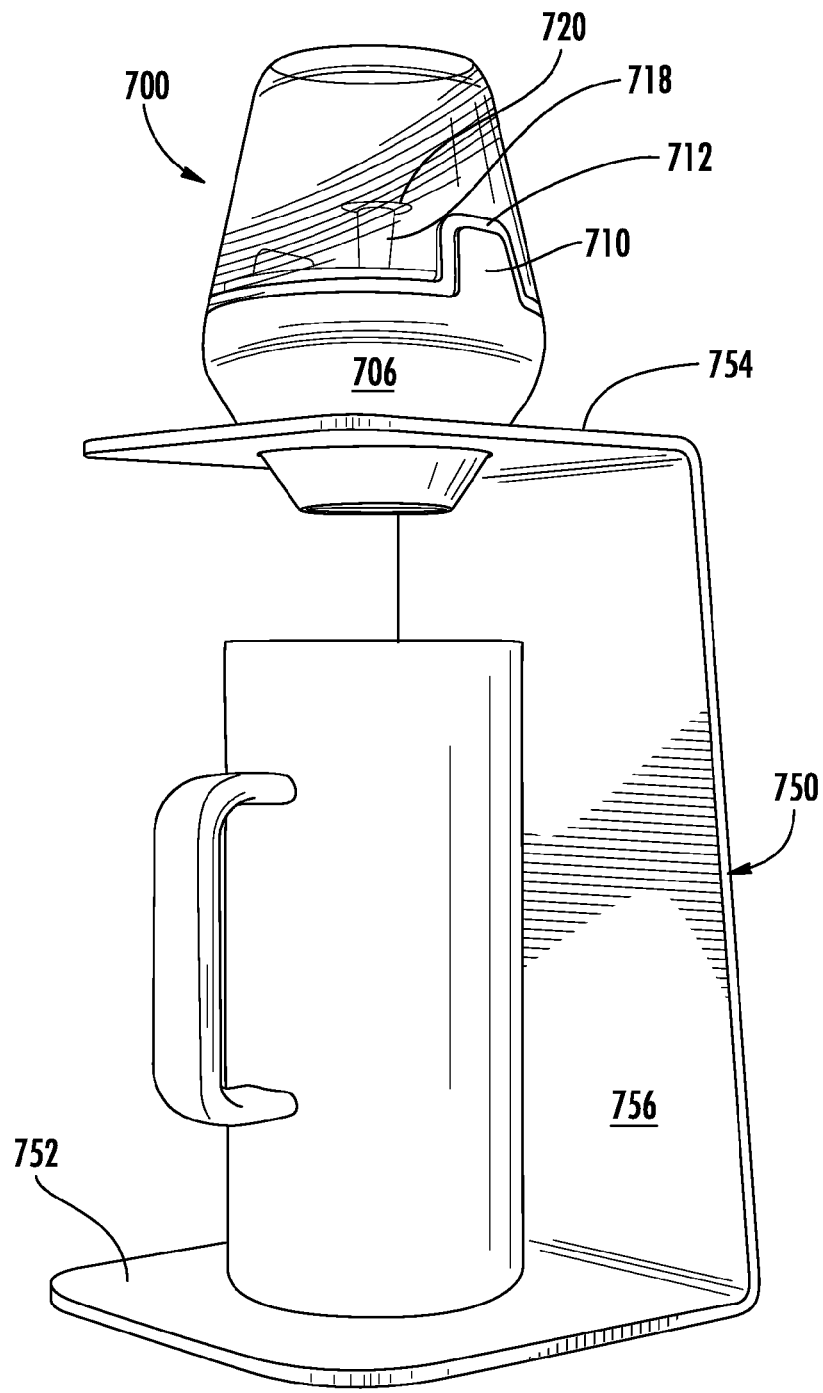
FIG. 42 is a perspective view of another aspect of the present disclosure showing a shaped gravity filter assembly held above a liquid retaining vessel where the liquid retaining vessel is positioned under a dispensing shelf.

FIG. 42 shows another embodiment that employs a stand 750 that has a base 752 that is substantially planar or planar and an upwardly extending shelf support wall 756 that operably engages the planar shelf 754 that is typically substantially parallel to the base 752. The shelf has at least one filter receiving aperture that receives the filter above a vessel loading location on the base.

Figure 43:
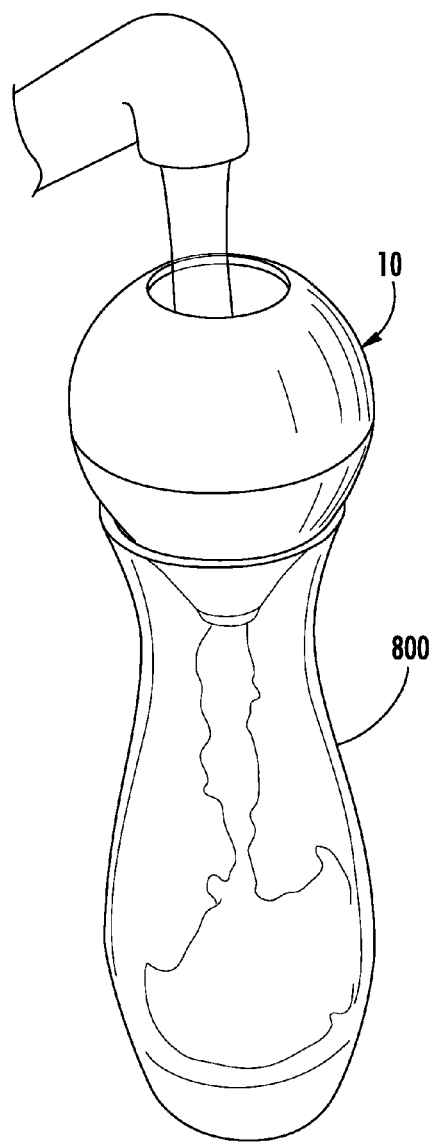
FIG. 43 is a drop-shaped gravity filter assembly according to another aspect of the present disclosure being filled with water from a faucet and filtered water dispensed into a beverage container.

FIG. 43 shows a smaller water bottle vessel 800 that receives the gravity filter assembly 10 within the opening of the bottle vessel 800 such that it is frictionally held in place by the rim of the vessel and the shape of the bottom portion of the filter. The sloped nature of the bottom portion of the filter facilitates in engagement with a plurality of vessels. Alternatively, differently sized adapters may be used and receive filters of the present disclosure. The filter may be a universal filter that can be engaged with multiple adapters. Additionally, as shown in FIG. 44, the filter 900 according to another aspect of the present disclosure may be directly engaged, typically threadably engaged, in a watertight sealed manner to a faucet 902. The filter media within the filter that treats water according to the embodiments of FIGS. 43 and 44 may be used so long as the pressure does not exceed atmospheric pressure plus the height of the water within the filter and/or a water flow rate that is slow enough to still effectively treat water passing through or coming into contact with the filter media.

Figure 45:
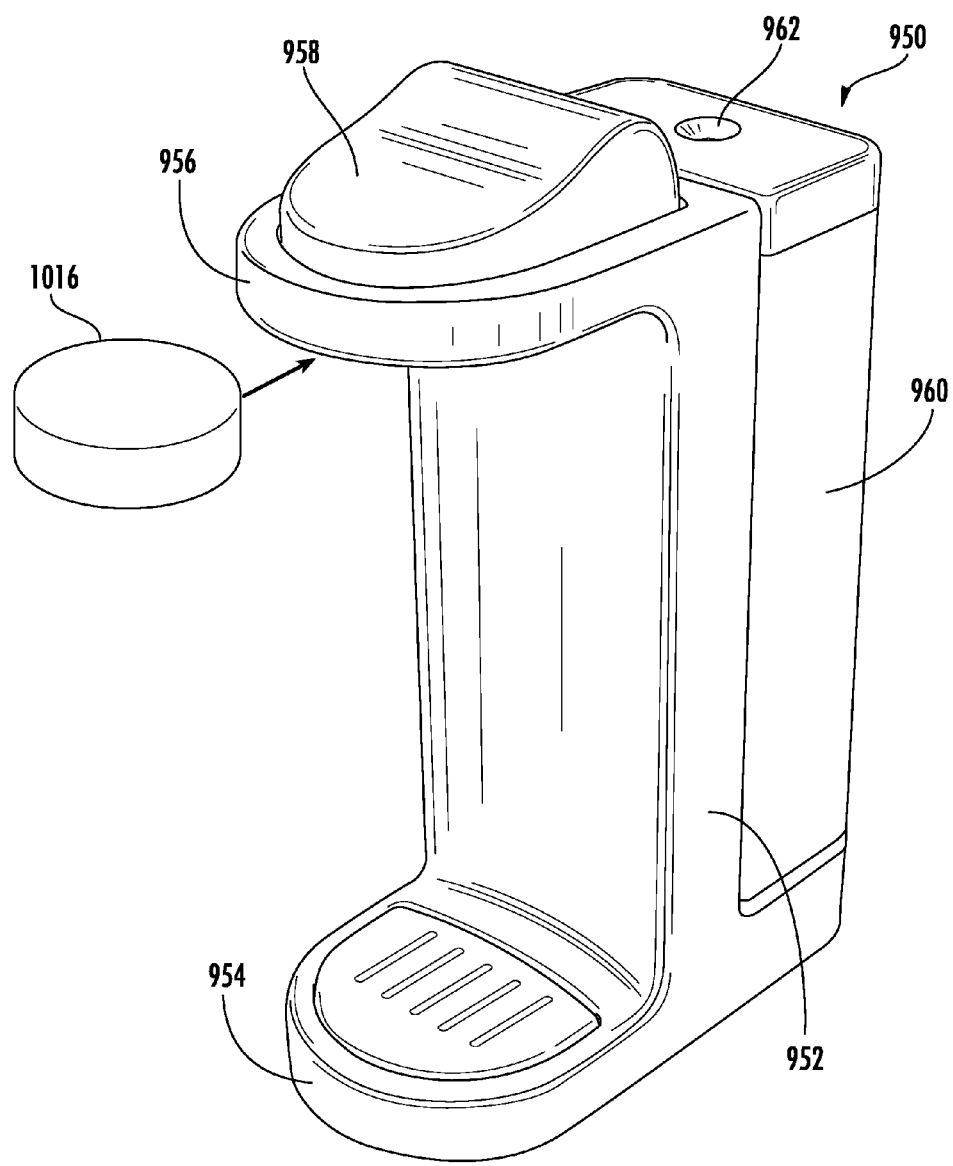
FIG. 45 is a perspective view of a filtered water beverage dispenser having a water reservoir on its rearward side and a removable water filter.

FIG. 45 is a countertop stand 950. The countertop stand 950 typically has a main frame portion 952, a base portion 954, and a top pump portion 956 that includes a manual pump 958 that manually delivers water from within a reservoir 960. The reservoir may be filled independently by removing of the reservoir from the stand 950, delivering water from a water source into the reservoir, and returning the reservoir to the stand, or by pouring water into the reservoir through a pour through top aperture 952. A filter 1016 according to the present disclosure may also be removably engaged and disengaged with the stand as shown in FIG. 45. The filter is positioned such that water being delivered to the vessel passes through the filter and into the vessel.

Figure 46:
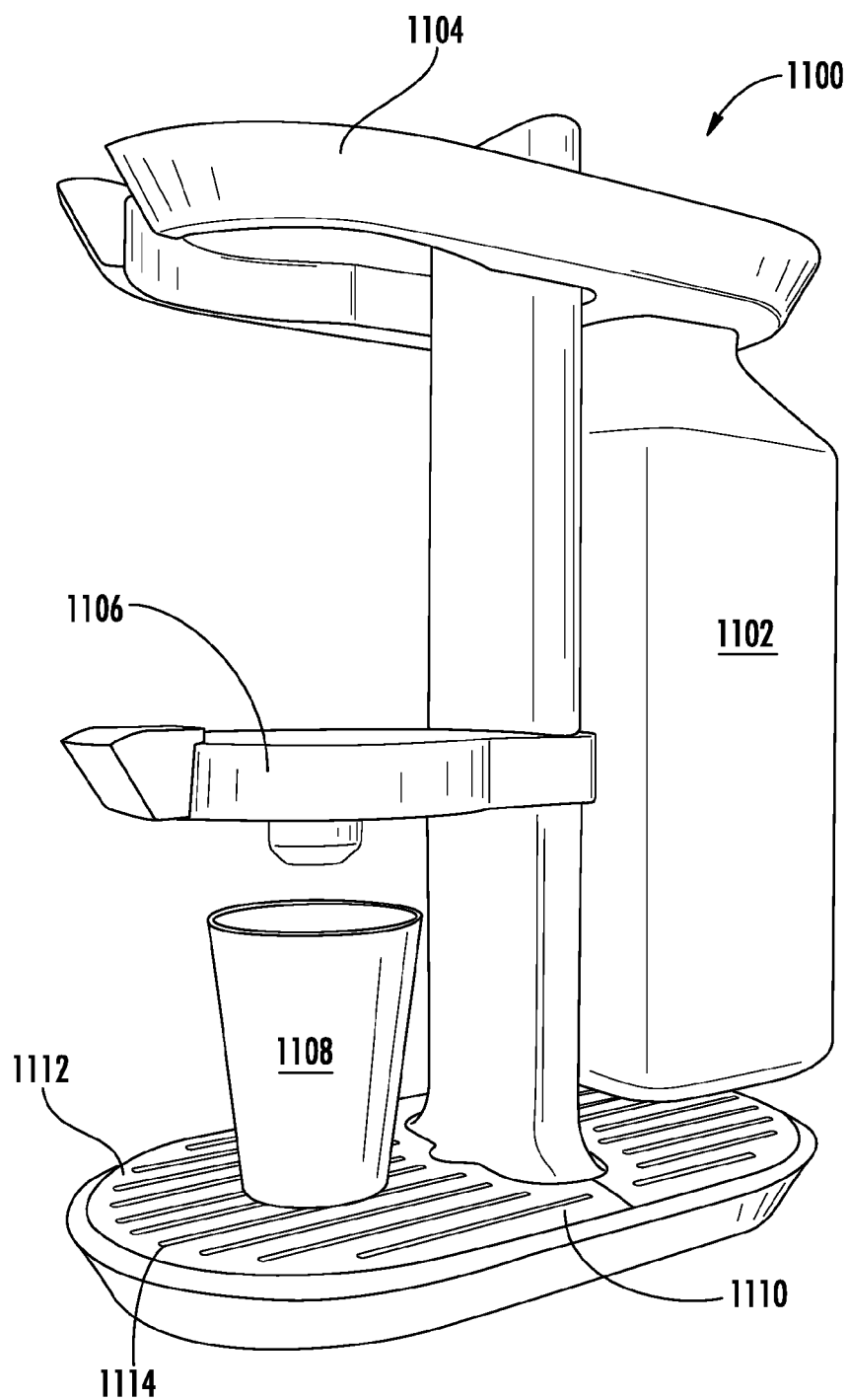
FIG. 46 is a perspective view of a water filtering station with a reservoir suspended from a top section and a gravity filter assembly suspension shelf.

An alternative stand 1100 is shown in FIG. 46 that has an untreated water vessel 1102 suspended from a top shelf 1104. A secondary, intermediate shelf 1106 may engage the gravity filter assembly 10 in a position above the vessel 1108. The base 1110 typically has a drip drain tray cover 1112 with a series of drain slots 1114.

FIG. 48 shows that the drop-shaped gravity filter assembly 10 may be sized and configured to engage vessels with multiple different sized openings. The smaller filter on the left of the Figure may be used to fill smaller vessels with treated fluids, typically water, and the larger filter on the right may be used to fill larger vessels. Filters of the present disclosure may be configured of any size. The filters may engage any size vessel.

Figure 51:
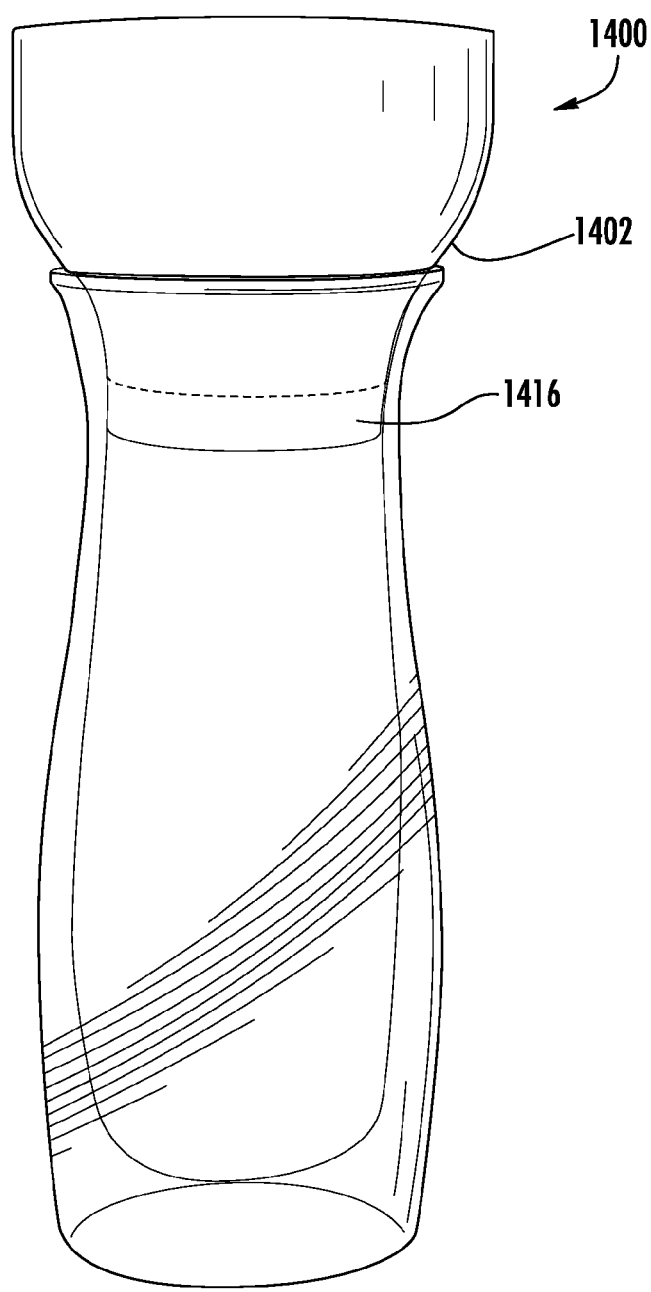
FIG. 51 is a perspective view of a vessel with a filter and adapter engaged to the vessel opening.

FIG. 49 is an alternative embodiment of the gravity filter assembly 1200 of the present disclosure suspended using a substantially elliptical frame 1210 to suspend the gravity filter assembly 1200 over the opening of the vessel 1212. Typically, the filter 1216 is engaged with the filter and an adapter that is contoured to engage a plurality of differently sized vessels. As shown in FIG. 50, the adapter 1300 may include a user removable filter 1316 and configured such that the top edge of the adapter is the top of the vessel, which is depicted as a pitcher. An alternative adapter 1400 is shown in FIG. 51. The adapters, which are a modification of a filter of the present disclosure, each engage the universal filters such that a user can use the same filter in a plurality of differently sized adapter to enable the user to fill a multitude of vessels with differently sized filling apertures. The adapters typically have differently sized sloped water receiving portions 1402 and receive the filters in the bottom portion 1416 of the adapter. In the broadest sense, the gravity filters described herein may be considered an adapter according to the present disclosure.

Figure 54:
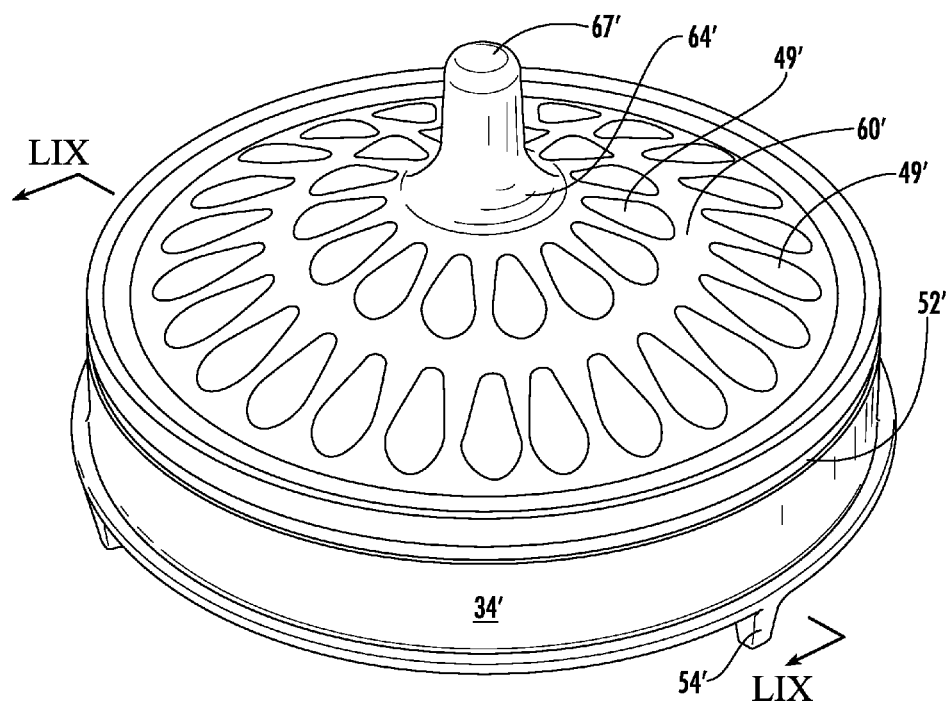
FIG. 54 is a perspective view of the filter according to another aspect of the present disclosure.
Figure 55:
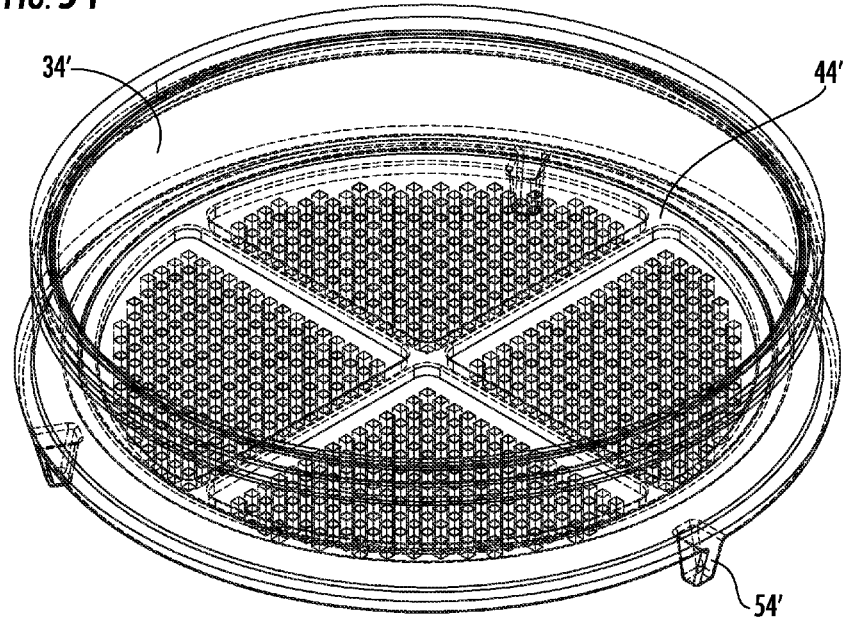
FIG. 55 is a perspective view of the filter shown in FIG. 54 with the top cap portion removed.
Figure 56:
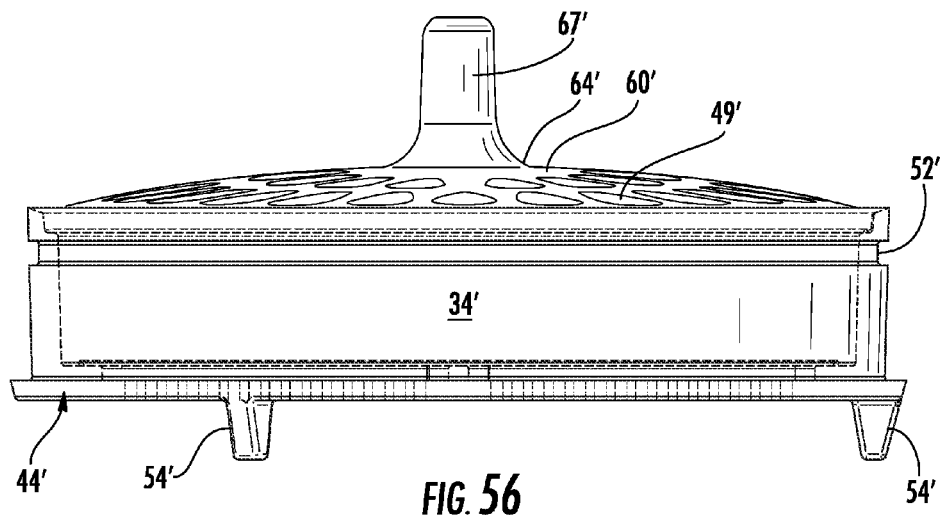
FIG. 56 is an elevated side view of the filter shown in FIG. 54.
Figure 57:
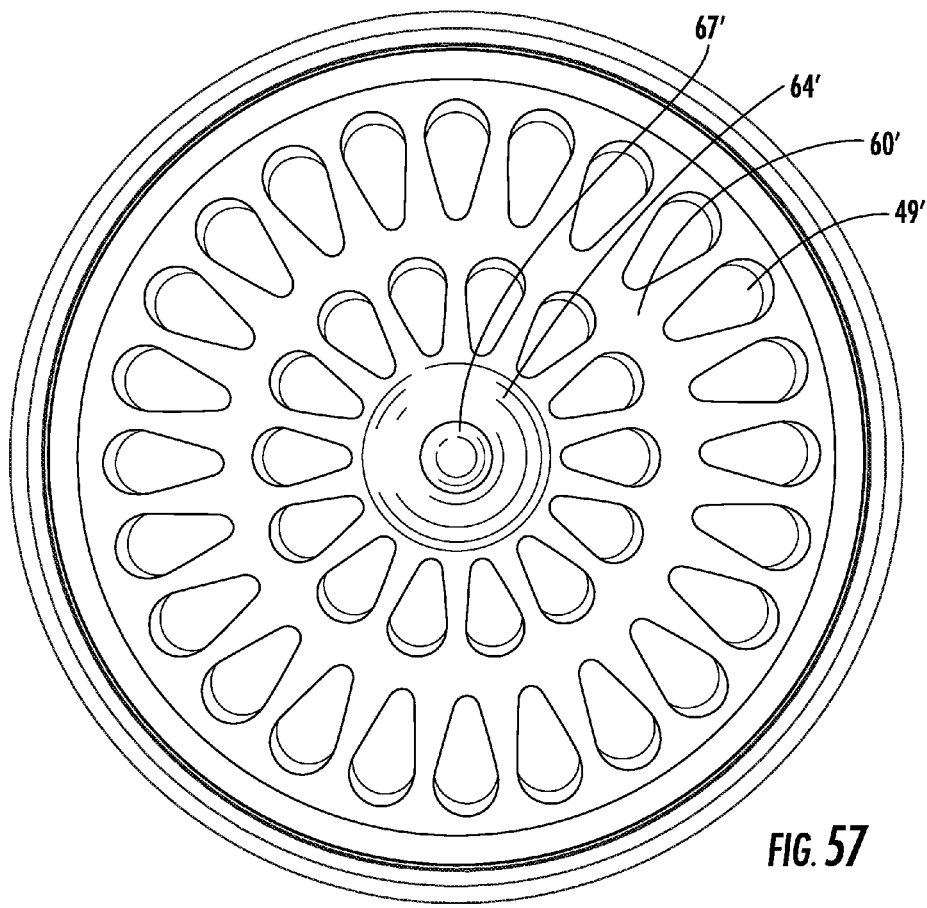
FIG. 57 is a top view of the filter shown in FIG. 54.
Figure 59:
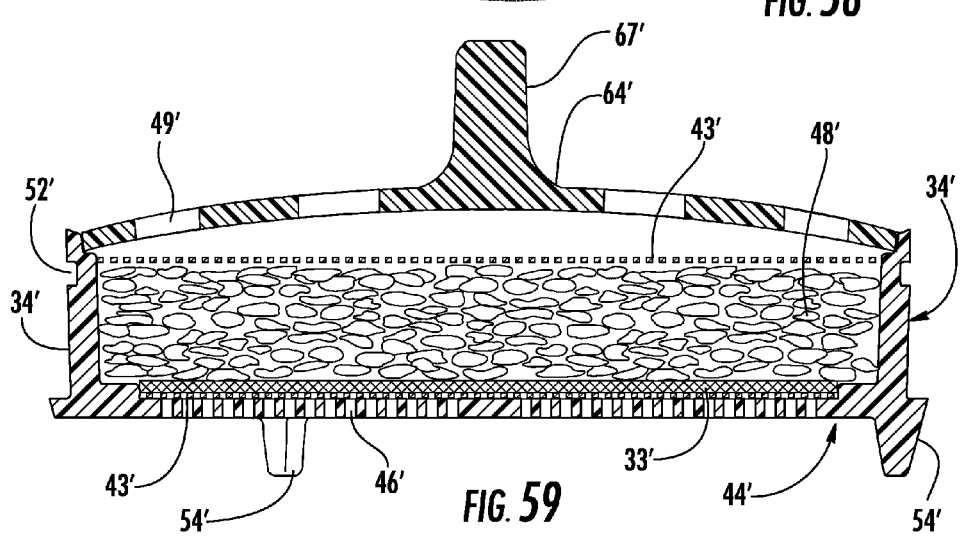
FIG. 59 is a cross-section view of the filter of FIG. 54 taken along line LIX-LIX.

An alternative filter of the present disclosure is shown in FIGS. 54-60. The filter top 60' is domed shaped. A mesh material 43' is typically engaged with the top of the filter side wall section 34', for example within a slot (not shown) that runs about the interior perimeter surface of the filter side wall section 34'. The mesh screen material 43' across the top of the filter and beneath the domed filter top 60' is typically constructed of stainless steel or a plastic material such as polypropylene or polyethylene or other thermoplastic polymer material. The mesh is constructed and engaged with the filter side wall such that it is capable and configured to expand upward into the domed section if the filter material 48' expands. The top mesh 43' may be heat staked to the side wall section. At the top of dome 60' is an upstanding spindle 67' having an outwardly flared base as shown in FIG. 54. The domed filter top 60' rests upon a ledge near the top of side wall 34'. Below the ledge, on the outside of sidewall 34' is a circumferential recess 52', as illustrated in FIG. 59. With regards to FIGS. 58 and 59, at the bottom of the sidewall 34' are downwardly extending projections 54'. Alternatively, it could be positioned within a slot described above. The mesh material may also be less than taut across the top of the filter in order to further facilitate this expansion. When engaged within a slot, the expansion may also facilitated by the mesh screens engagement to the side wall section 34' such that it laterally moves, if necessary, within a slot on the interior surface of the side wall as discussed above. Other engagements, constructions and materials that allow for the mesh screen to expand while still retaining the filter material can also be employed. The filter material 48' may be a loose media and not a compressed media.

The side wall section 34' is integral with the filter base 44' according to this aspect of the present disclosure. The side wall section 34' and the base 44' are typically injection molded thermoplastic material such as polypropylene or polyethylene. These components form a "can" like structure with a generally upward facing, U-shaped cross-section. The mesh component 43' positioned at the base is typically integrally engaged to the base and molded into the base. The mesh may be constructed of any of the materials discussed above that might be used for the screen on the top of the filter.

As shown in FIG. 59, the filter may also employ an open cell polyethylene expansion block 33'. The open cell material could conceivably be another polymer material. This material's primary function is as a safeguard against damage caused by expansion of the filter material 48'. If the filter material 48' has already been hydrated and is a type of filter media that expands such that the filter media has already expanded into the domed portion of the filter, this material prevents damage if, for example, the filter in such a condition is placed into a freezing environment that would cause the water within the filter material to further expand as it becomes solid.

Figure 60:
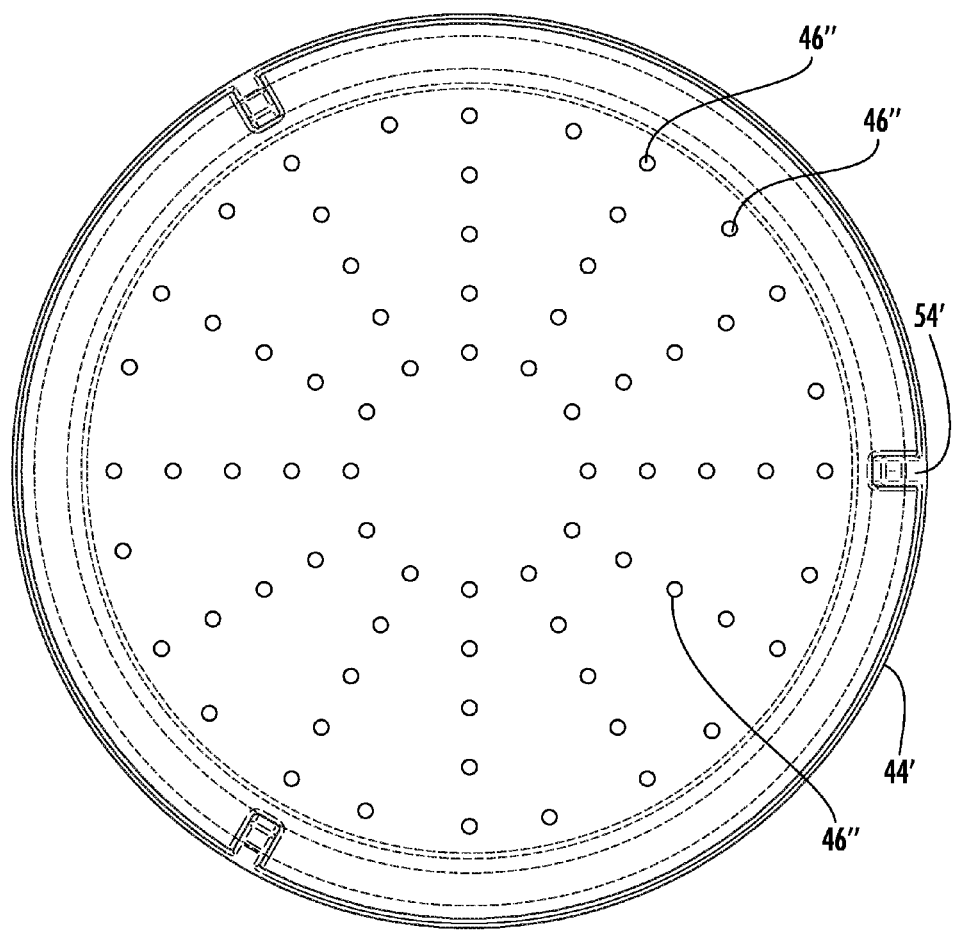
FIG. 60 is a bottom view of a filter, such as the filter shown in FIG. 54, according to another aspect of the present invention.

The apertures 49' in the domed filter top 60' are shown shaped as raindrops, but could be any shape desired. The apertures 46' in the base are typically smaller apertures that have a square cross-section with apertures having a diameter of from about 0.5 mm to about 2.0 mm, more typically from about 1.0 mm to about 2.0 mm. A slightly modified pattern of apertures 46" are shown in FIG. 60. The apertures of FIG. 60 are typically similarly sized as discussed above. The apertures are distributed in a generally spoked pattern about a central ring of apertures and have an outer ring of apertures around the peripheral portion of the base as shown in FIG. 60. This size and shape of aperture in the base (see FIG. 60) causes the filtered/treated water to fall into a vessel or into the bottom funnel portion in a manner that drips across the surface of the base and resembles rainfall.

The invention claimed is:

1. A gravity-driven water filtering system comprising: a gravity-driven water filter configured to engage and deliver treated water through apertures of various sizes and a filter receiving device, wherein the gravity-driven water filter comprises:

a bottom portion having at least one treated fluid outlet, an upper perimeter, and a bottom portion side wall that defines an interior volume of the bottom portion and wherein the bottom portion side wall is a shaped surface that is configured to frictionally engage a plurality of differently sized fluid vessel openings and still allow treated fluid to be delivered to the interior of a fluid vessel through the at least one treated fluid outlets;

a water filter comprising a fluid treatment medium positioned within the water filter wherein the filter is operably engaged with the bottom portion and having a fluid intake location and a fluid outgoing location that delivers treated fluid to the interior volume of the bottom portion and out of the at least one treated fluid outlet of the bottom portion; a top portion having an interior volume defined by at least one wall, at least one fluid inlet, and a bottom perimeter defining an opening and wherein the top portion is configured to received fluid from at least one fluid inlet and the bottom perimeter defines an opening that is configured to allow fluid from the at least one inlet to flow into contact with an intake surface of the water filter; and wherein the water filter is configured to be removably engaged by hand without the use of tools from the bottom portion and the water filter, the bottom portion and the top portion are each configured to be removably engaged and disengaged to allow for replacement of the filter and reassembly of the overall gravity-driven water filter by hand and without the use of tools; and wherein the filter receiving device comprises a filter receiving device chosen from the group consisting of:

a) a flat bottomed stand that receives the top portion of the gravity-driven water filter where the stand has a top portion receiving center section insert that has the same shape as the top portion such that the top portion matingly engages the top portion receiving center section insert and wherein the top portion receiving center section insert is detachable from a perimeter stand portion positioned about a perimeter of the top portion receiving center section insert when engaged therewith;

b) an adapter configured to either (1) provide an ability for the gravity-driven water filter to deliver treated water to a vessel having a aperture larger than the width of the gravity-driven water filter or (2) engage a side wall of the vessel and suspend the gravity-driven water filter from a side wall over an aperture larger than the width of the gravity-driven water filter.

2. The gravity-driven water filtering system of claim 1, wherein the top portion receiving center section insert is removable and a metal material with a plurality of apertures configured to allow draining of water from within the gravity-driven water filter into a space under the top portion receiving center section; and wherein the water filter further comprises a perimeter sidewall within the water filter; wherein the top portion of the fluid filter seals the filter treatment medium within the water filter.

3. The gravity-driven water filtering system of claim 2, wherein the top portion receiving center section insert has a plurality of apertures radially aligned extending away from a center aperture that is larger than the other apertures.

4. The gravity-driven water filtering system of claim 1, wherein the filter receiving device is an adapter that engages the side wall of the vessel and the adapter includes a vessel suspension system integrated with the bottom portion that is moveable between a retracted closed position where the perimeter conforms at least substantially with an exterior shape of the bottom portion and an open vessel engaging position wherein the vessel suspension system is connected to the bottom portion by a hinge.

5. The gravity-driven water filtering system of claim 1, wherein the filter receiving device is an adapter that engages the side wall of the vessel and the adapter is a vessel suspension system integrated with the bottom portion that is moveable between a retracted closed position and an open vessel engaging position where the vessel suspension system spans a filling aperture of the vessel across opposing sides of the vessel and wherein the vessel suspension system includes two opposing curved sections configured to be pulled away from the bottom portion and hold the gravity-driven water filter in a substantially central position over the opening of the vessel but the curved sections are each operably connected to the bottom portion by a bridging support member.

6. The gravity-driven water filtering system of claim 1, wherein the filter receiving device is a filter suspension device that is separate from the gravity-driven water filter wherein the filter suspension device includes at least two laterally extending planar members that extend away from a center filter receiving aperture and are rotatably connected to one another about the center filter receiving aperture.

7. The gravity-driven water filtering system of claim 6, wherein the ends of the laterally extending planar members each have an aperture that at least substantially align when the laterally extending planar member are aligned over one another.

8. The gravity-driven water filtering system of claim 7, wherein the filter receiving device is a stand that includes a base and an upwardly extending shelf support wall that extends upward to a planar shelf that is at least substantially parallel to the base and has at least one filter receiving aperture that receives the filter above a vessel loading location.

9. The gravity-driven water filtering system of claim 1, wherein the fluid treatment medium is a water treatment medium configured to treat water at a rate of at least about one liter per minute while removing at least chlorine odor and chlorine taste components from the water.

10. The gravity-driven water filtering system of claim 1, wherein the filter is at least partially positioned within the bottom portion.

11. The gravity-driven water filtering system of claim 1, wherein the bottom portion side wall is a funnel shape with a funnel outlet portion having the at least one treated fluid outlet that is at least one treated water outlet.

12. The gravity-driven water filtering system of claim 1, wherein the fluid intake location of the water filter is an at least substantially planar surface with apertures between structural support spokes that extend between a hub and a perimeter of the at least substantially planar surface of the fluid intake location and the fluid outgoing location is an at least substantially planar surface with apertures between structural supports that extend between a hub and a perimeter of the at least substantially planar surface of the fluid outgoing location.

13. The gravity-driven water filtering system of claim 12, wherein the apertures of the at least substantially planar surface are apertures between structural supports that extend between a hub and a perimeter of the at least substantially planar surface of the water outgoing location.

14. The gravity-driven water filtering system of claim 1, wherein the fluid treatment medium is a water treatment medium that reduces chlorine taste and odor components (CTO) per NSF 42 to a minimum of 60 gallons and wherein the gravity-driven water treatment medium allows for a water flow rate of at least about two liter per minute of flow through the water treatment medium under a force of gravity.

15. A gravity-driven water filtering system comprising: a gravity-driven water filter configured to engage and deliver treated water through apertures of various sizes and a filter receiving device,
wherein the gravity-driven water filter comprises:
a bottom portion having at least one treated water outlet, an upper perimeter, and a bottom portion side wall that defines an interior volume of the bottom portion and wherein the bottom portion side wall is a shaped surface that is configured to frictionally engage a plurality of differently sized water vessel openings and still allow treated water to be delivered to the interior of a water vessel through the at least one treated water outlets;
a water filter comprising a water treatment medium positioned within the water filter wherein the filter is operably engaged with the bottom portion and having a water intake location and a water outgoing location that delivers treated water to the interior volume of the bottom portion and out of the at least one treated water outlet of the bottom portion;
a top portion having an interior volume defined by at least one wall, at least one water inlet, and a bottom perimeter defining an opening and wherein the top portion is configured to received water from at least one water inlet and the bottom perimeter defines an opening that is configured to allow water from the at least one inlet to flow into contact with an intake surface of the water filter; a perimeter side-wall within the water filter; wherein the sidewall receives the water treatment medium, and a filter top portion of the water filter seals the water treatment material within the perimeter side-wall of the water filter; and
wherein the water filter is configured to be removably engaged by hand without the use of tools from the bottom portion and the water filter, the bottom portion and the top portion are each configured to be removably engaged and disengaged to allow for replacement of the filter and reassembly of the overall gravity-driven water filter by hand and without the use of tools and wherein the water treatment medium allows for a water flow rate of at least about one liter per minute of flow through the water treatment medium under a force of gravity;
wherein the filter receiving device comprises a filter receiving device chosen from the group consisting of:
a) a flat bottomed stand that receives the top portion of the gravity-driven water filter where the stand has a top portion receiving center section insert that has the same shape as the top portion such that the top portion matingly engages the top portion receiving center section insert and wherein the top portion receiving center section insert is detachable from a perimeter stand portion positioned about the perimeter of the top portion receiving center section insert when engaged therewith;
b) a carrying device that engages the gravity-driven water filter and includes at least one carrying aperture; and
c) an adapter configured to either (1) provide an ability for the gravity-driven water filter to deliver treated water to a vessel having a aperture larger than the width of the gravity-driven water filter or (2) engage a side wall of the vessel and suspend the gravity-driven water filter from a side wall over an aperture larger than the width of the gravity-driven water filter.

16. The gravity-driven water filtering system of claim 15, wherein the water treatment medium reduces chlorine taste and odor components (CTO) per NSF 42 to a minimum of 60 gallons and wherein the gravity-driven water treatment medium allows for a water flow rate of at least about two liter per minute of flow through the water treatment medium under a force of gravity.

17. The gravity-driven water filtering system of claim 15, wherein the filter receiving device is a carrying device constructed of elastomeric material with a base that seals the at least one fluid inlet of the filter and a top cap that seals the at least one treated fluid outlet where the top cap includes a carrying aperture configured to engage a hook, a clasp, or other attachment device and wherein the carrying device provides an anaerobic seal that prevents microorganisms or other materials from entering the filter and contaminating the interior of the filter when it is positioned within the carrying device.

18. The gravity-driven water filtering system of claim 17, wherein the carrying device further comprises an elastomeric retention band that extends through the carrying aperture and is pulled taut and positioned within a channel on the base of the carrying device to apply a face to securely hold the filter within the carrying device.

19. A gravity-driven water filtering system comprising: a gravity-driven water filter configured to engage and deliver treated water through apertures of various sizes and a filter receiving device, wherein the gravity-driven water filter comprises:

a bottom portion having at least one treated water outlet, an upper perimeter, and a bottom portion side wall that defines an interior volume of the bottom portion and wherein the bottom portion side wall is a shaped surface that is configured to frictionally engage a plurality of differently sized fluid vessel openings and still allow treated fluid to be delivered to the interior of a fluid vessel through the at least one treated fluid outlets the bottom portion of the gravity-driven water treatment device, wherein the bottom portion further comprises: an overmolded material matingly engaged with a host component of the bottom portion and the overmolded material is a plastic or elastomeric material that is a separate component from the host component;

a water filter comprising a water treatment medium positioned within the water filter wherein the filter is operably engaged with the bottom portion and having a water intake location and a water outgoing location that delivers treated water to the interior volume of the bottom portion and out of the at least one treated water outlet of the bottom portion wherein the water filter is configured to reduce chlorine taste and odor components (CTO) per NSF 42 to a minimum of 60 gallons and allows for a water flow rate of at least about one liter per minute of flow through the water treatment medium under a force of gravity and wherein the water filter includes a water filter housing with an interior volume containing the water treatment medium positioned within the water filter housing wherein the water filter housing comprises a top surface with a plurality of apertures for receiving water through the top surface and into contact with the water treatment medium, a bottom surface with a plurality of apertures for delivering treated fluid to the bottom portion, and at least one perimeter wall extending between the top surface and the bottom surface wherein the at least one perimeter wall has an exterior surface and at least one outwardly projecting lip positioned between the bottom surface of the fluid treatment housing and about ⅔ of the distance up from the bottom surface toward the top surface of the water filter housing wherein the outwardly projecting lip rests upon a shelf on the interior of the bottom portion and extending inwardly toward the interior of the bottom portion; and a top portion having an interior volume defined by at least one wall forming a curved exterior, at least one water inlet, and a bottom perimeter defining an opening and wherein the top portion is configured to received water from at least one water inlet and the bottom perimeter defines an opening that is configured to allow water from the at least one inlet to flow into contact with an intake surface of the water filter;

wherein the water filter is configured to be removably engaged by hand without the use of tools from the bottom portion and the water filter, the bottom portion and the top portion are each configured to be removably engaged and disengaged to allow for replacement of the filter and reassembly of the overall gravity-driven water filter by hand and without the use of tools;

wherein the water filter housing is cylindrically shaped and further comprises at least one or a plurality of tabular members extending downward from the outwardly projecting lip and away from the at least one perimeter wall and wherein the bottom portion further comprises a plurality of spaced apart tabular members that extend into the interior volume of the bottom portion and define spaces therebetween that are configured to receive the tabular members of the filter housing and wherein the tabular members have an upper shelf extending into the interior of the bottom portion and tapered sides extending downward toward the treated water outlet of the bottom portion; and wherein the at least one perimeter wall has at least one visible indicator thereon that is visible through a cutout portion of the bottom portion of the gravity water treatment device.

20. The gravity-driven water filtering system of claim 19, wherein the filter receiving device is a filter suspension device that is separate from the gravity-driven water filter wherein the filter suspension device includes at least two laterally extending planar members that extend away from a center filter receiving aperture and are rotatably connected to one another about the center filter receiving aperture.

\* \* \* \* \*